United States Patent
Pei et al.

(10) Patent No.: US 12,333,595 B2
(45) Date of Patent: *Jun. 17, 2025

(54) OPTIMIZING BRA SIZING ACCORDING TO THE 3D SHAPE OF BREASTS

(71) Applicant: CORNELL UNIVERSITY, Ithaca, NY (US)

(72) Inventors: Jie Pei, Greenville, TX (US); Jintu Fan, Ithaca, NY (US); Susan P. Ashdown, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 17/871,501

(22) Filed: Jul. 22, 2022

(65) Prior Publication Data

US 2022/0366715 A1    Nov. 17, 2022

Related U.S. Application Data

(63) Continuation of application No. 17/571,066, filed on Jan. 7, 2022, now Pat. No. 11,430,246, which is a
(Continued)

(51) Int. Cl.
*G06V 10/25* (2022.01)
*G06Q 30/0601* (2023.01)
(Continued)

(52) U.S. Cl.
CPC ......... *G06Q 30/0643* (2013.01); *G06V 10/25* (2022.01); *G06V 10/762* (2022.01); *G06V 20/653* (2022.01); *G06V 40/10* (2022.01)

(58) Field of Classification Search
CPC .... G06Q 30/0643; G06V 40/10; G06V 10/25; G06V 10/762; G06V 10/764;
(Continued)

(56) References Cited

U.S. PATENT DOCUMENTS 8,294,708 B2   10/2012   Mordaunt et al.
8,754,887 B2    6/2014   Kuffner, Jr. et al.
(Continued)

FOREIGN PATENT DOCUMENTS

CN   1928923 A      3/2007
CN   100442314 C   12/2008
(Continued)

OTHER PUBLICATIONS

Zheng Rong; Breast sizing and development of 3D seamless Bra; Hog Kong Polytechnic University; 2006 (Year: 2006).*
(Continued)

*Primary Examiner* — Shaghayegh Azima
(74) *Attorney, Agent, or Firm* — Scully, Scott, Murphy & Presser, P.C.

(57) ABSTRACT

Methods and systems for developing a sizing system through categorization and selection of prototypes, which can be regarded as the most appropriate fit model, is described. Once categorized and prototypes are selected, recommendations for the sizing of a target body part may be issued.

28 Claims, 27 Drawing Sheets
(7 of 27 Drawing Sheet(s) Filed in Color)

Related U.S. Application Data continuation of application No. PCT/US2020/054172, filed on Oct. 3, 2020.

(60) Provisional application No. 62/910,063, filed on Oct. 3, 2019.

(51) Int. Cl.
  G06V 10/762 (2022.01)
  G06V 20/64 (2022.01)
  G06V 40/10 (2022.01)

(58) Field of Classification Search
  CPC ............... G06V 10/147; G06V 20/653; G06V 30/1429; G06V 30/1437
  See application file for complete search history.

(56) References Cited

U.S. PATENT DOCUMENTS

| | | | |
|---|---|---|---|
| 9,189,886 B2 | 11/2015 | Black et al. | |
| 9,436,987 B2 | 9/2016 | Ding et al. | |
| 9,652,871 B2 | 5/2017 | Han et al. | |
| 9,788,759 B2* | 10/2017 | Ferrantelli | A61B 5/0077 |
| 10,018,466 B2 | 7/2018 | Laan et al. | |
| 10,109,048 B2 | 10/2018 | Buelow et al. | |
| 10,366,524 B2* | 7/2019 | Andon | G06V 40/10 |
| 10,366,533 B2* | 7/2019 | Sugita | G06T 19/20 |
| 10,380,796 B2 | 8/2019 | Ma et al. | |
| 10,402,994 B2 | 9/2019 | Farahbakhshian et al. | |
| 10,460,512 B2* | 10/2019 | Chen | G06V 10/40 |
| 10,515,259 B2 | 12/2019 | Jones et al. | |
| 10,546,181 B2 | 1/2020 | Schickel et al. | |
| 10,796,480 B2* | 10/2020 | Chen | G06V 40/166 |
| 10,891,776 B2 | 1/2021 | Weber et al. | |
| 10,909,275 B2* | 2/2021 | Amar | A41C 3/144 |
| 11,443,454 B2* | 9/2022 | Duong | G06N 3/082 |
| 2010/0303341 A1 | 12/2010 | Hausler | |
| 2010/0309226 A1* | 12/2010 | Quack | G06F 16/50 382/218 |
| 2013/0315475 A1* | 11/2013 | Song | G06T 19/00 382/154 |
| 2014/0019087 A1 | 1/2014 | Bengtson et al. | |
| 2015/0002547 A1 | 1/2015 | Itai | |
| 2015/0003631 A1 | 1/2015 | Ise et al. | |
| 2015/0062301 A1 | 3/2015 | Lin et al. | |
| 2015/0154453 A1 | 6/2015 | Wilf | |
| 2016/0029706 A1 | 2/2016 | Braverman | |
| 2016/0203361 A1* | 7/2016 | Black | G06T 7/75 382/203 |
| 2019/0311488 A1* | 10/2019 | Sareen | G06T 7/60 |
| 2020/0000165 A1* | 1/2020 | Wang | A41H 1/00 |
| 2020/0046037 A1 | 2/2020 | Nagata | |
| 2020/0275862 A1* | 9/2020 | Fennell | A61F 5/01 |
| 2021/0030366 A1* | 2/2021 | Chen | A61B 5/7267 |
| 2022/0079510 A1* | 3/2022 | Robillard | G06N 5/01 |

FOREIGN PATENT DOCUMENTS

| | | |
|---|---|---|
| CN | 103690172 A | 4/2014 |
| CN | 103871106 A | 6/2014 |
| CN | 105956910 A | 9/2016 |
| CN | 106228417 A | 12/2016 |
| CN | 108366636 A | 8/2018 |

OTHER PUBLICATIONS

Arch, E. et al., "A Comprehensive Method to Measure Three-Dimensional Bra Motion During Physical Activity", Journal of Applied Biomechanics, 2018, pp. 1-15.

Azouz, Z. et al., "Characterizing human shape variation using 3D anthropometric data", Visual Comput, 2006, pp. 302-314, vol. 22.

Baek, S. et al., "Parametric human body modelling system for virtual garment fitting", Int. J. Computer Aided Engineering and Technology, 2013, pp. 242-261, vol. 5, Nos. 2/3.

Bosquet, A. et al., "Body Scan Processing, Generative Design, and Multiobjective Evaluation of Sports Bras", Appl. Sci., 2020, pp. 1-21, vol. 10, No. 6126.

Chen, L. et al., "A study of breast motion using non-linear dynamic FE analysis", Ergonomics, 2013, pp. 868-878, vol. 56, No. 5.

Chen, X. et al., "Breast volume measurement by mesh projection method based on 3D point cloud data", International Journal of Clothing Science and Technology, 2015, pp. 221-236, vol. 27, issue 2.

Colaianni, M. et al., "Volume Extraction from Body Scans for Bra Sizing", 6th International Conference on 3D Body Scanning Technologies, Oct. 2015, pp. 106-113.

Domingo, J. et al., "Modeling of Female Human Body Shapes for Apparel Design based on cross mean sets", Expert Systems with Applications, Oct. 2014, pp. 6224-6234, vol. 41, No. 14.

Hilton, A. et al., "Whole-body modelling of people from multiview images to populate virtual worlds", The Visual Computer, 2000, pp. 411-436, vol. 16.

Jamkrajang, P. et al., "Comparison of vertical breast displacement between two different sports bra designs", Turkish Journal of Sport and Exercise, 2014, pp. 97-99, vol. 16, issue 2.

Kartsounis, G.A. et al., "E-Tailor: Integration of 3D Scanners, CAD and Virtual-Try-on Technologies for Online Retailing of Made-to-Measure Garments", E-Business Applications, 2003, pp. 137-152.

Le, Q. et al., "Overlay Upper Clothing Textures to Still Images Based on Human Pose Estimation", Journal of Mobile Multimedia, 2014, pp. 43-57, vol. 10, No. 1&2.

Lu, J. et al., "Automated anthropometric data collection using 3D whole body scanners", Expert Systems with Applications, 2008, pp. 407-414, vol. 35.

Ju, J. et al., "The development of an intelligent system for customized clothing making", Expert Systems with Applications, 2010, pp. 799-803, vol. 37.

Lu, M. et al., "Mechanical analysis of breast-bra interaction for sports bra design", Materials Today Communications, 2016, pp. 28-36, vol. 6.

McGhee, D. et al., "Breast vol. and bra size", International Journal of Clothing Science and Technology, Oct. 2011, pp. 351-360, vol. 23, No. 5.

Milligan, A. et al., "Magnitude of multiplanar breast kinematics differs depending upon run distance", Journal of Sports Sciences, 2015, pp. 2025-2034, vol. 33, No. 19.

Mitchell, N., "Utilisation of 3D Body Scanning Technology as a Research Tool When Establishing Adequate Bra Fit", 2013, pp. 1-141.

Nolte, K. et al., "The effectiveness of a range of sports bras in reducing breast displacement during treadmill running and two-step star jumping", J Sports Med Phys Fitness, 2016, pp. 1311-1317, vol. 56, No. 11.

Paquet, E. et al., "Segmentation and classification of anthropometric data for the apparel industry", Anthropometry, apparel sizing and design, 2014, pp. 123-140.

Wang, C. et al., "Comparison of breast motion at different levels of support during physical activity", Journal of Human Sport and Exercise, 2017, pp. 1256-1264, vol. 12, No. 4.

Wood, L. et al., "Predictors of Three-Dimensional Breast Kinematics during Bare-Breasted Running", Medicine and Science in Sports and Exercise, 2012, pp. 1351-1357, vol. 44, No. 7.

Zheng, R. et al., "Development of a new chinese bra sizing system based on breast anthropometric measurements", International Journal of Industrial Ergonomics, 2007, pp. 697-705, vol. 37, issue 8.

Zhou, J. et al., "Studies of three-dimensional trajectories of breast movement for better bra design", Textile Research Journal, 2012, pp. 242-254, vol. 82, No. 3.

Zhou, J. et al., "Identifying effective design features of commercial sports bras", Textile Research Journal, 2012, pp. 1-14.

International Search Report and Written Opinion dated Jan. 12, 2021 received in International Application No. PCT/US2020/054172.

Rong, Z., "Breast Sizing and Development of 3D Seamless Bra", Hong Kong Polytechnic University, Dec. 2006.

(56) References Cited

OTHER PUBLICATIONS

Extended European Search Report dated Jul. 20, 2023 received in European Patent Application No. EP 20871926.0.

* cited by examiner

|  | P1 | P2 | P3 | ... | P44 | P45 |
|---|---|---|---|---|---|---|
| P1 | 0 | 184.02 | 378.31 | ... | 222.75 | 211.84 |
| P2 | 184.02 | 0 | 337.86 | ... | 337.66 | 86.73 |
| P3 | 378.31 | 337.86 | 0 |  | 173.74 | 198.68 |
| ... | ... | ... | ... | 0 | ... | ... |
| P44 | 222.75 | 337.66 | 173.74 | ... | 0 | 182.38 |
| P45 | 211.84 | 86.73 | 198.68 | ... | 182.38 | 0 |

|  | P1 | P2 | P3 | P4 |
|---|---|---|---|---|
| P1 | 0 | 184.02 | 378.31 | 130.28 |
| P2 | 184.02 | 0 | 337.86 | 100.24 |
| P3 | 378.31 | 337.86 | 0 | 177.00 |
| P4 | 130.28 | 100.24 | 177.00 | 0 |

| Group # | Prototypes | The original averaged fit-loss between a prototype and each group members | The fit-loss of the new case from the prototype | The aggregate-fit-loss increase when the new case becomes the prototype of the group |
|---|---|---|---|---|
| 1 | Subject a | 75.2 | 130.3 | 3533.1 |
| 2 | Subject b | 68.4 | 202.9 | 4336.6 |
| 3 | Subject c | 108.3 | 104.7 | 2001.7 |
| 4 | Subject d | 0 | 1578.0 | 1578.0 |

Fig. 11

| # | Band size | Underbust measurement ranges (in.) | Underbust measurement ranges (cm) | Number of subjects included (j) |
|---|---|---|---|---|
| 1 | 28 | [27, 29) | [68.6, 73.7) | 8 |
| 2 | 30 | [29, 31) | [73.7, 78.7) | 17 |
| 3 | 32 | [31, 33) | [78.7, 83.8) | 12 |
| 4 | 34 | [33, 35) | [83.8, 88.9) | 6 |
| 5 | Over 34 | [35, ∞) | [88.9, ∞) | 2 |

Fig. 15A

| Band size | | Number of sub-groups (shape groups) within each band-size group | | | | | | |
|---|---|---|---|---|---|---|---|---|
| 28 | $j_1$ | 1 | 1 | 1 | 2 | 3 | 5 | 8 |
| 30 | $j_2$ | 1 | 1 | 3 | 5 | 6 | 12 | 17 |
| 32 | $j_3$ | 1 | 1 | 2 | 2 | 4 | 6 | 12 |
| 34 | $j_4$ | 1 | 2 | 3 | 4 | 5 | 5 | 6 |
| Over 34 | $j_5$ | 1 | 1 | 1 | 2 | 2 | 2 | 2 |
| | | | | | | | | |
| Total number of groups | k | 5 | 6 | 10 | 15 | 20 | 30 | 45 |

Fig. 15B

OPTIMIZING BRA SIZING ACCORDING TO THE 3D SHAPE OF BREASTS

CROSS-REFERENCE TO RELATED APPLICATION

This application is a continuation application of U.S. patent application Ser. No. 17/571,066 filed on Jan. 7, 2022, which is a continuation application of PCT Application PCT/US2020/054172 filed Oct. 3, 2020, which claims priority under 35 U.S.C. § 120 from U.S. Provisional Application No. 62/910,063 filed on Oct. 3, 2019. The entire subject matter of the applications are incorporated herein by reference.

BACKGROUND

Unless otherwise indicated herein, the materials described in this section are not prior art to the claims in this application and are not admitted to be prior art by inclusion in this section.

In some examples, sizing systems for ready-to-wear form-fitting garment can be based on body measurements or tape measurements. For example, the sizing system for bras can be based on body measurements such as bust circumference and underbust circumference. Further, bra sizing systems are distributed into discrete numbers of different band size and cup size, regardless of a shape and form of the female's breasts.

SUMMARY

In an aspect of the disclosure, disclosed is a method for developing a sizing scheme for a body part. The method may include: receiving, by a processor, a plurality of three-dimensional (3D) images. The plurality of 3D images may include a body part of a body of different individuals; for each 3D image among the plurality of 3D images, the method may include identifying a first region of interest in the 3D image and shifting, by the processor, the first region of interest to align a central axis of the first region of interest with a 3D reference point. The central axis may be parallel to a longitudinal axis of a body of an individual. Also, for each 3D image among the plurality of 3D images, the method may include shifting, by the processor, the first region of interest in a vertical direction. The vertical direction may be parallel to a longitudinal axis of the body to align a landmark feature in the first region of interest with the 3D reference point. For each 3D image among the plurality of 3D images, the method may also include identifying a second region of interest in the first region of interest, identifying, by the processor, a number of data points on a surface of the second region of interest, determining, by the processor, a plurality of distances between the number of data points and the 3D reference point and comparing, by the processor, the plurality of distances with distances determined for the same data points in each one of the other 3D images at the same data points, such that the 3D image can be compared with every other 3D image among the plurality of 3D images in pairs. The method may further include determining, by the processor, a fit-loss value for every possible combination of pairs of 3D images with respect to the second region of interest among the plurality of 3D images. Each fit-loss value may indicate a discrepancy between the corresponding pair of 3D images with respect to the second region of interest, and the determination of the fit-loss value of each pair of 3D images may be based on a result of the comparison of distances between the pair of 3D images with respect to the second region of interest. The method may further include generating, by the processor, a dissimilarity matrix using the fit-loss values determined for each pair of 3D images and clustering, by the processor, the plurality of 3D images into a number of groups based on the dissimilarity matrix, each group may correspond to a size for the body part.

In some aspects, the body part can be a pair of breasts.

In some aspects, the method may further include in response to identifying the first region of interest, the first region of interest including an entire torso, determining a first average value of image points among the first region of interest in a first direction, the first direction may be orthogonal to the longitudinal axis of the body; determining a second average value of image points among the first region of interest in a second direction orthogonal to the first direction and orthogonal to the longitudinal axis of the body; defining the central axis of the first region of interest as intersecting by the first average value and the second average value, the central axis may be orthogonal to the first and second directions.

In some aspects, shifting the first region of interest in the vertical direction may include shifting the first region of interest until a plane orthogonal to the central axis intersects with the central axis at the 3D reference point, where the plane intersects the landmark feature.

In some aspects, the landmark feature may be determined by defining a midpoint between a pair of nipples in the vertical direction, where the plane intersects the midpoint.

In some aspects, identifying the second region of interest may include removing image points located on a first side of a plane parallel to a coronal plane of the body and intersects the 3D reference point. The body part may be located on a second side of the plane parallel to the coronal plane opposite from the first side.

In some aspects, identifying the second region of interest may include rotating the first region of interest to an angle where Moiré patterns are formed, identifying an upper bound of the second region of interest based on the formed Moiré patterns and identifying an immediate crease of a protruded region in the first region of interest to identify a lower bound of the second region of interest.

In some aspects, the number of data points identified on the surface of the second region of interest of each 3D image may be a fixed number.

In some aspects, the number of data points may be identified based on a predefined sequence.

In some aspects, identifying the number of data points may include partitioning, by the processor, the second region of interest into a number of equally distributed slices orthogonal to the central axis, partitioning, by the processor, each slice into a plurality of portions based on a fixed angular interval. Each portion may correspond to an angle value, and each portion may include a set of points. For each portion on each slice: the method may include determining, by the processor, an average distance among distances of the set of points with respect to the 3D reference point and setting, by the processor, a point associated with the average distance as a data point represented by the angle value corresponding to the portion. The data point can be one of the number of data points identified.

In some aspects, the method may further include determining, an absence of image points in particular portions of the slices, where the absent image points are removed from the 3D image during the identification of the first region of interest; assigning a set of undefined values to the absent image points in the particular portion as data points.

In some aspects, determining the fit-loss value may be based on differences between data points from each pair of 3D images located on the same slice and associated with the same angle values.

In some aspects, determining the fit-loss value includes using a dissimilarity function that quantifies a shape difference between a pair of 3D images with respect to the second region of interest.

In some aspects, the dissimilarity function may be represented as:

$$L(d1, d2) = \frac{1}{m}\sum_{i=1}^{n}(d1_i - d2_i)^2$$

where:
- d1 represents a first 3D image;
- d2 represents a second 3D image;
- d1i represents an i-th data point in the first 3D image;
- d2i represents an i-th data point in the second 3D image;
- n represents total number of data points;
- m represents a number of data point pairs where both data points excludes undefined values.

In some aspects, there are N number of 3D images in the plurality of images and clustering the 3D images includes applying, by the processor, one or more clustering algorithms on the dissimilarity matrix, where application of each of the one or more clustering algorithms may result in grouping the plurality of 3D images into k clustered groups of 3D images, where k ranges from 1 to N. In the k=1 clustered group, there are N 3D images in the one group. In the k=N clustered groups, there can be one 3D image in each group. For each of the one or more clustering algorithms, the method may include determining an overall aggregated fit-loss for each k, where k ranges from 1 to N. The overall aggregated fit-loss for a k may be determined by adding the aggregated fit-loss for each group in the k, The aggregated fit-loss being determined for each group in the k after the prototype has been selected for each group in the k. The processor may identify a particular clustering algorithm among the one or more clustering algorithms that results in the overall aggregated fit-loss for the particular clustering algorithm can be the lowest overall aggregated fit-loss among the overall aggregated fit-loss for all clustering algorithms for the most ks from k=1 to k=N.

In some aspects, the method may further include identifying a value m that represents a number of clustered groups among the 1 to N clustered groups of 3D images having an aggregated fit-loss value across a respective clustered groups among the 1 to N clustered groups satisfying a criterion and setting the identified value of m as the number of groups for the size of the body part.

In some aspects, the method may further include for each 3D image in a group of 3D images: designating the 3D image as a candidate prototype image for the group, aggregating fit-loss values of every different pair of 3D images with respect to the second region of interest in the group that includes the candidate prototype image, where a different pair may not have the same two 3D images, identifying one candidate prototype image that has a lowest aggregated fit-loss value among the aggregated fit-loss values associated with each candidate prototype; and assigning the identified candidate prototype image as a prototype image of the group.

In some aspects, the plurality of 3D images may be received from one or more 3D scanners.

In some aspects, the one or more 3D scanners may be one or more of a mobile phone, a point of sale terminal, a 3D body scanner, a handheld 3D scanner, and a stationary 3D scanner.

In other aspects, disclosed is a method for assigning a body part to a size in a sizing scheme. The method may include receiving, by a processor, a three-dimensional (3D) image that includes the body part of a body of an individual, identifying a first region of interest in the 3D image, shifting, by the processor, the first region of interest to align a central axis of the first region of interest with a 3D reference point. The central axis may be parallel to a longitudinal axis of a body of an individual. The method may also include shifting, by the processor, the first region of interest in a vertical direction, the vertical direction may be parallel to a longitudinal axis of the body to align a landmark feature in the first region of interest with the 3D reference point. The method may also include identifying a second region of interest in the first region of interest, identifying, by the processor, a number of data points on a surface of the second region of interest, determining, by the processor, a plurality of distances between the number of data points and the 3D reference point and extracting, by the processor, a plurality of prototype images from a memory. The plurality of prototype images represents a plurality of size groups, respectively. The method may also include comparing, by the processor, the plurality of distances determined for the received 3D image with distances determined for the same data points in each one of the prototype images with respect to the second region of interest, such that the received 3D image may be compared with every prototype image among the plurality of prototype images in pairs with respect to the second region of interest, determining, by the processor, a fit-loss value between the received 3D image and each one of the extracted prototype images with respect to the second region of interest based on the comparing; identifying, by the processor, a lowest fit-loss value among the determined fit-loss values; and assigning the received 3D image to the size group represented by the prototype image corresponding to the lowest fit-loss value.

In some aspects, the body part can be a pair of breasts.

In some aspects, the method may further include in response to identifying the first region of interest, where the first region of interest includes an entire torso, determining a first average value of image points among the first region of interest in a first direction, the first direction being to orthogonal a longitudinal axis of the body; determining a second average value of image points among the first region of interest in a second direction orthogonal to the first direction and orthogonal to a longitudinal axis of the body; and defining the central axis of the first region of interest as intersecting by the first average value and the second average value. The central axis may be orthogonal to the first and second directions.

In some aspects, the shifting the first region of interest in the vertical direction may include shifting the first region of interest until a plane orthogonal to the central axis intersects with the central axis at the 3D reference point, wherein the plane intersects the landmark feature.

In some aspects, the landmark feature may be determined by defining a midpoint between a pair of nipples in the vertical direction and wherein the plane intersects the midpoint.

In some aspects, identifying the second region of interest may include removing image points located on a first side of a plane parallel to a coronal plane of the body and intersects the 3D reference point, and the body part may be located on a second side of the plane parallel to the coronal plane opposite from the first side.

In some aspects, the identifying the second region of interest may include rotating the first region of interest to an angle where Moiré patterns are formed, identifying an upper bound of the second region of interest based on the formed Moiré patterns and identifying an immediate crease of a protruded region in the first region of interest to identify a lower bound of the second region of interest.

In some aspects, the plurality of size groups may be based on a dissimilarity matrix generated using a plurality of fit-loss values corresponding to every possible combination of pairs of 3D images among a plurality of 3D images. The plurality of 3D images may include the body part of different individuals.

In some aspects, the plurality of fit-loss values may be determined based on a dissimilarity function that quantifies a shape difference between a pair of 3D images with respect to the second region of interest.

In some aspects, the 3D image may be received from one or more 3D scanners.

In some aspects, the one or more 3D scanners may be one or more of a mobile phone, a point of sale terminal, a 3D body scanner, a handheld 3D scanner, and a stationary 3D scanner.

In some aspects, the method may further include designating the received 3D image as a candidate prototype image of the assigned size group, determining an aggregated fit-loss value for the assigned size group based on the received 3D image being designated as the candidate prototype image, comparing the determined aggregated fit-loss value with an original aggregated fit-loss value of the assigned size group plus the fit-loss value between the received 3D image and the prototype image. In response to the determined aggregated fit-loss value being less than the original aggregated fit-loss value plus the fit-loss value between the received 3D image and the prototype image, the method may further include assigning the received 3D image as a new prototype image in the size group and in response to the determined aggregated fit-loss value being greater than or equal to the original aggregated fit-loss value plus the fit-loss value between the received 3D image and the prototype image, the method may further include keeping the prototype image as the prototype image of the size group.

In other aspects, disclosed is a method for assigning a body part to a size in a sizing scheme for the body part. The method may include receiving, by a processor, a three-dimensional (3D) image that includes a body part of a body of an individual, identifying a first region of interest in the 3D image, shifting, by the processor, the first region of interest to align a central axis of the first region of interest with a 3D reference point. The central axis may be parallel to a longitudinal axis of a body of an individual. The method may further include shifting, by the processor, the first region of interest in a vertical direction. The vertical direction may be parallel to a longitudinal axis of the body to align a landmark feature in the first region of interest with the 3D reference point. The method may further include determining, by the processor, a band size based on a size parameter of a circumference of a lower bound of the body part in the first region of interest. The band size may be among a plurality of band sizes. The method may further include extracting, by the processor, a plurality of prototype images from a memory, wherein the plurality of prototype images represents a plurality of shape groups corresponding to the determined band size, identifying a second region of interest in the first region of interest, identifying, by the processor, a number of data points on a surface of the second region of interest, determining, by the processor, a plurality of distances between the number of data points and the 3D reference point and comparing, by the processor, the plurality of distances determined for the received 3D image with distances determined for the same data points in each one of the extracted prototype images representing the plurality of shape groups corresponding to the determined band size with respect to the second region of interest, such that the received 3D image can be compared with every extracted prototype image among the plurality of prototype images in pairs with respect to the second region of interest. The method may further include determining, by the processor, a fit-loss value between the received 3D image and each one of the extracted prototype images with respect to the second region of interest based on the comparing, identifying, by the processor, a lowest fit-loss value among the determined fit-loss values and assigning the received 3D image to the shape group represented by the prototype image corresponding to the lowest fit-loss value. A recommend size group may include the determined band size and the shape group.

In some aspects, the body part can be a pair of breasts.

In some aspects, the method may further include in response to identifying the first region of interest, where the first region of interest includes an entire torso, determining a first average value of image points among the first region of interest in a first direction. The first direction may be to orthogonal a longitudinal axis of the body. The method may include determining a second average value of image points among the first region of interest in a second direction orthogonal to the first direction and orthogonal to a longitudinal axis of the body and defining the central axis of the first region of interest as intersecting by the first average value and the second average value. The central axis may be orthogonal to the first and second directions.

In some aspects, the shifting the first region of interest in the vertical direction may include shifting the first region of interest until a plane orthogonal to the central axis intersects with the central axis at the 3D reference point, wherein the plane intersects the landmark feature.

In some aspects, the landmark feature may be determined by defining a midpoint between a pair of nipples in the vertical direction and wherein the plane intersects the midpoint.

In some aspects, the identifying the second region of interest may include: removing image points located on a first side of a plane parallel to a coronal plane of the body and intersects the 3D reference point, and the body part may be located on a second side of the plane parallel to the coronal plane opposite from the first side.

In some aspects, the identifying the second region of interest may include rotating the first region of interest to an angle where Moiré patterns are formed, identifying an upper bound of the second region of interest based on the formed Moiré patterns and identifying an immediate crease of a protruded region in the first region of interest to identify a lower bound of the second region of interest.

In some aspects, the size parameter may be received from another device.

In some aspects, the determining the band size may include determining the circumference of the lower bound of the body part in the first region of interest, identifying a size parameter range that includes the determined circumference and assigning the band size representing the size parameter range as the band size of the body part in the 3D image.

In some aspects, the plurality of shape groups in each of the plurality of band sizes may be based on a dissimilarity matrix generated using a plurality of fit-loss values corresponding to every possible combination of pairs of 3D images among a plurality of 3D images assigned to a respective band size with respect to the second regions of interest. The plurality of 3D images may include the body part of different individuals.

In some aspects, the plurality of fit-loss values may be determined based on a dissimilarity function that quantifies a shape difference between a pair of 3D images with respect to the second region of interest.

In some aspects, the 3D image may be received from one or more 3D scanners.

In some aspects, the one or more 3D scanners may be one or more of a mobile phone, a point of sale terminal, a 3D body scanner, a handheld 3D scanner, and a stationary 3D scanner.

In some aspects, the method may further designating the received 3D image as a candidate prototype image of the assigned shape group within the determined band size, determining an aggregated fit-loss value for the assigned shape group based on the received 3D image being designated as the candidate prototype image and comparing the determined aggregated fit-loss value with an original aggregated fit-loss value of the assigned shape group plus the fit-loss value between the received 3D image and the prototype image. In response to the determined aggregated fit-loss value being less than the original aggregated fit-loss value plus the fit-loss value between the received 3D image and the prototype image, the method may include assigning the received 3D image as a new prototype image in the shape group and in response to the determined aggregated fit-loss value being greater than or equal to the original aggregated fit-loss value plus the fit-loss value between the received 3D image and the prototype image, the method may include keeping the prototype image as the prototype image of the shape group.

In some aspects, disclosed is a method for developing a sizing scheme for a body part. The method may include receiving, by a processor, a plurality of three-dimensional (3D) images. The plurality of 3D images may include a body part of a body of different individuals. For each 3D image among the plurality of 3D images, the method may include identifying a first region of interest in the 3D image, determining a size parameter corresponding to a circumference of a lower bound of the body part in the first region of interest and assigning the 3D image to a band size based on the size parameter. The method may further include for each 3D image among the plurality of 3D images, shifting, by the processor, the first region of interest to align a central axis of the first region of interest with a 3D reference point, where the central axis may be parallel to a longitudinal axis of a body of an individual, and shifting, by the processor, the first region of interest in a vertical direction to align a landmark feature in the first region of interest with the 3D reference point. The vertical direction may be parallel to a longitudinal axis of the body. For each 3D image among the plurality of 3D images, the method may further include identifying a second region of interest in the first region of interest, identifying, by the processor, a number of data points on a surface of the second region of interest, determining, by the processor, a plurality of distances between the number of data points and the 3D reference point and comparing, by the processor, the plurality of distances with distances determined for the same data points in each one of the other 3D images assigned to the same band size, such that the 3D image can be compared with every other 3D image among the 3D images assigned to the same band size in pairs. For each band size, the method may include determining, by the processor, a fit-loss value for every possible combination of pairs of 3D images with respect to the second region of interest among the 3D images assigned to the same band size, where each fit-loss value can indicate a discrepancy between the corresponding pair of 3D images with respect to the second region of interest, and the determination of the fit-loss value of each pair of 3D images can be based on a result of the comparison of distances between the pair of 3D images with respect to the second region of interest. For each band size, the method may further include generating, by the processor, a dissimilarity matrix using the fit-loss values determined for each pair of 3D images assigned to the same band size and clustering, by the processor, the 3D images assigned to the band size into a number of shape groups based on the dissimilarity matrix. Each shape group may correspond to a shape for the body part.

In some aspects, the body part may be a pair of breasts.

In some aspects, the method may further include in response to identifying the first region of interest, where the first region of interest include an entire torso, determining a first average value of image points among the first region of interest in a first direction, the first direction may be to orthogonal a longitudinal axis of the body, determining a second average value of image points among the first region of interest in a second direction orthogonal to the first direction and orthogonal to a longitudinal axis of the body and defining the central axis of the first region of interest as intersecting by the first average value and the second average value. The central axis may be orthogonal to the first and second directions.

In some aspects, the shifting the first region of interest in the vertical direction include shifting the first region of interest until a plane orthogonal to the central axis intersects with the central axis at the 3D reference point, wherein the plane intersects the landmark feature.

In some aspects, the landmark feature may be determined by defining a midpoint between a pair of nipples in the vertical direction and wherein the plane intersects the midpoint.

In some aspects, the identifying the second region of interest may include removing image points located on a first side of a plane parallel to a coronal plane of the body and intersects the 3D reference point, and the body part may be located on a second side of the plane parallel to the coronal plane opposite from the first side.

In some aspects, the identifying the second region of interest may include rotating the first region of interest to an angle where Moiré patterns are formed, identifying an upper bound of the second region of interest based on the formed Moiré patterns and identifying an immediate crease of a protruded region in the first region of interest to identify a lower bound of the second region of interest.

In some aspects, the number of data points may be identified on the surface of the second region of interest of each 3D image and may be a fixed number.

In some aspects, the number of data points may be identified based on a predefined sequence.

In some aspects, the identifying the number of data points may include partitioning, by the processor, the second region of interest into a number of equally distributed slices orthogonal to the central axis and partitioning, by the processor, each slice into a plurality of portions based on a fixed angular interval. Each portion corresponds to an angle value, and each portion includes a set of points. For each portion on each slice, the method may further include determining, by the processor, an average distance among distances of the set of points with respect to the 3D reference point and setting, by the processor, a point associated with the average distance as a data point represented by the angle value corresponding to the portion. The data point may be one of the number of data points identified.

In some aspects, the method may include determining, an absence of image points in particular portions of the slices, wherein the absent image points are removed from the 3D image during the identification of the first region of interest and assigning a set of undefined values to the absent image points in the particular portion as data points.

In some aspects, the determining the fit-loss value may be based on differences between data points from each pair of 3D images located on the same slice and associated with the same angle values.

In some aspects, the determining the fit-loss value may include using a dissimilarity function that quantifies a shape difference between a pair of 3D images with respect to the second region of interest.

In some aspects, the dissimilarity function may be represented as:

$$L(d1, d2) = \frac{1}{m}\sum_{i=1}^{n}(d1_i - d2_i)^2$$

wherein:
d1 represents a first 3D image in a band size group;
d2 represents a second 3D image in the band size group;
d1i represents an i-th data point in the first 3D image;
d2i represents an i-th data point in the second 3D image;
n represents total number of data points;
m represents a number of data point pairs where both data points excludes undefined values.

In some aspects, there may be N number of 3D images assigned to the band size, and clustering the 3D images for a band size may include applying, by the processor, one or more clustering algorithms on the dissimilarity matrix of the band size, where application of each of the one or more clustering algorithms may result in grouping the plurality of 3D images into k clustered shape groups of 3D images, where k ranges from 1 to N. In the k=1 clustered shape group, there may be N 3D images in the one shape group. In the k=N clustered shape groups, there may be one 3D image in each shape group. The clustering of the 3D images for the band size may further include, for each of the one or more clustering algorithms, determining an overall aggregated fit-loss for each k, where k ranges from 1 to N, and where the overall aggregated fit-loss for a k may be determined by adding the aggregated fit-loss for each clustered shape group in the k. The aggregated fit-loss may be determined for each clustered shape group in the k after the prototype has been selected for each shape group in the k. The processor may identify a particular clustering algorithm among the one or more clustering algorithms that results in the overall aggregated fit-loss for the particular clustering algorithm being the lowest overall aggregated fit-loss among the overall aggregated fit-loss for all clustering algorithms for the most ks from k=1 to k=N.

In some aspects, the method may further include determining a number of shape groups for each band size.

In some aspects, the determining a number of shape groups for each band size may include identifying a value m that represents a number of cluster shape groups among the 1 to N clustered shape groups of 3D images having an aggregated fit-loss value across respective clustered shape groups among the 1 to N clustered shape groups satisfying a criterion and setting the identified value of m as the number of shape groups.

In some aspects, the method may further include determining a total number of shape groups across all band sizes, and when the determined total number of shape groups is larger than a preset maximum value, the total number of shape groups may be reduced.

In some aspects, the determined total number of shape groups may be reduced to the preset maximum value. A distribution of the shape groups among the different band sizes may be based on a lowest overall aggregated fit-loss determined for j', where j' varies from a minimum value to the preset maximum value. The minimum value may be the number of the band sizes. The lowest overall aggregated fit-loss may be determined per j', from among a plurality of overall aggregated fit-loss for different combinations of the j' shape groups across the band sizes. The different combinations may be generated by iteratively adding a shape group to one of the band sizes, then removing the shape group from the one of the band sizes while adding a shape group to another band size while j' is maintained.

In some aspects, the plurality of 3D images may be received from one or more 3D scanners.

In some aspects, the one or more 3D scanners may be one or more of a mobile phone, a point of sale terminal, a 3D body scanner, a handheld 3D scanner, and a stationary 3D scanner.

In some aspects, there may be M number of 3D images assigned to all band sizes. Clustering the 3D images for a band size may include applying, by the processor, one or more clustering algorithms on the dissimilarity matrices of all band sizes, wherein application of each of the one or more clustering algorithms results in grouping the plurality of 3D images into j total number of clustered shape groups of 3D images for all band sizes, where j ranges from h to M. h is a number of band sizes. When j=h, there may be one shape group for each band size; and when j=M, there may be one 3D image in each shape group. For each of the one or more clustering algorithms, the method may further include determining an overall aggregated fit-loss for each j, where j ranges from h to M, and where the overall aggregated fit-loss for a j may be determined by adding the aggregated fit-loss for each clustered shape group in the j. The aggregated fit-loss may be determined for each clustered shape group in the j after the prototype has been selected for each shape group in the j. The processor may identify a particular clustering algorithm among the one or more clustering algorithms that results in the overall aggregated fit-loss for the particular clustering algorithm being the lowest overall aggregated fit-loss among the overall aggregated fit-loss for all clustering algorithms for the most js from j=h to j=M.

Also disclosed is one or more computer readable medium having instructions for performs one or more aspects.

Also disclosed is one or more systems for performing one or more aspects.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8A is a diagram illustrating an example of a dissimilarity matrix in accordance with aspects of the disclosure.

FIG. 8B is a diagram illustrating an example of a shape group in accordance with aspects of the disclosure.

FIG. 11 is a diagram illustrating a table that can be used to assign a new 3D image to a shape group in accordance with aspects of the disclosure.

FIG. 15A is a diagram illustrating a table showing for band size grouping of 45 scans using methods and systems described in accordance with aspects of the disclosure.

FIG. 15B is a diagram illustrating a table showing a processing of determining a number of shape group within a band size given a total number of shape groups (subgroups) for 45 scan using methods and systems described in accordance with aspects of the disclosure.

DETAILED DESCRIPTION

Figure 1A:
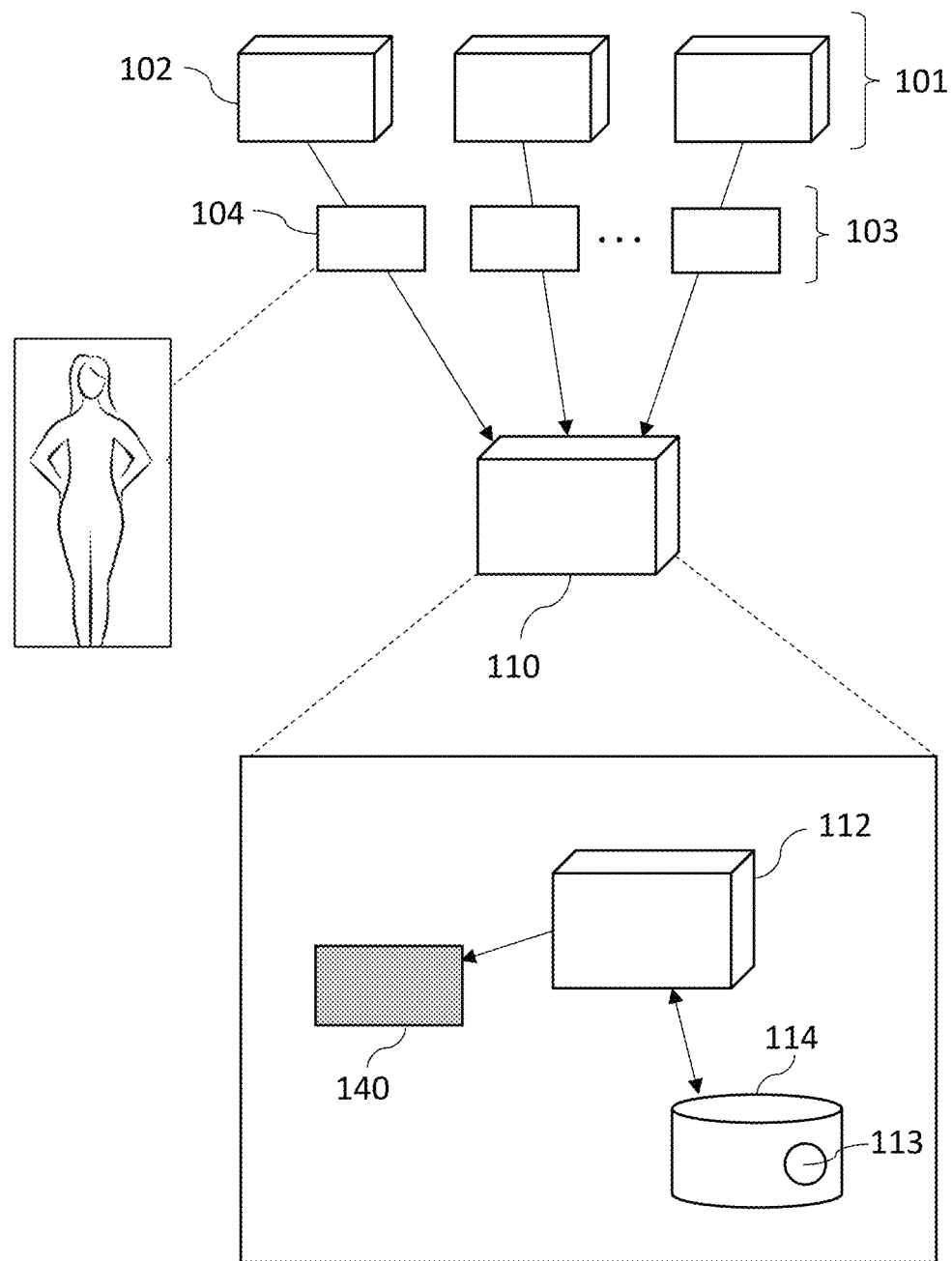
FIG. 1A is a diagram illustrating a system in accordance with aspects of the disclosure.

In the following description, numerous specific details are set forth, such as particular structures, components, materials, dimensions, processing steps and techniques, in order to provide an understanding of the various aspects of the present application. However, it will be appreciated by one of ordinary skill in the art that the various aspects of the present application may be practiced without these specific details. In other instances, well-known structures or processing steps have not been described in detail in order to avoid obscuring the present application.

Fit problem of ready-to-wear is very common and it is one of the primary reasons for return-shipping for online retailing. Unlike customization, ready-to-wear depends on the design of sizing systems. Most sizing systems being adopted uses body measurements such as bust circumference and underbust circumference, which may not represent the complicated 3D body shape, especially for female breasts. In addition, the extraction of body measurements can depend on the locations or actuate placement of body landmarks, but the definition and identification of landmarks can be a real challenge on the soft breast tissue (whereas bust point may be an exception). Therefore, instead of using traditional breast measurements, the methods and systems described herein can capture three-dimensional (3D) images of a target body part, such as, but not limited to the breasts, and obtain the locations of all the points on the surface to obtain the shape information. The shape information can be further processed by a computing device to develop a sizing scheme or sizing system that can be based on precise measurement across a vast distributed surface of the target body part, such as, but not limited to, the breasts, such that measurements such as bust circumference and underbust circumference, and also the shape of the breasts, are taken into consideration (without requiring a person to physically measure the lengths.

Further, different apparel companies may modified their products to fit relatively well on human fit models of certain selected sizes. For example, each company may hire its own fit models, causing inconsistency to arise and may confuse consumers. For instance, a garment of a certain size from different brands can be different in size when compared with each other. Also, it may be difficult for different companies to hire fit models that may be deemed as having "ideal" body measurements. For example, with respect to bra sizing, it may be relatively easy to find a person with bust circumference of 34 inches, but it may be relatively difficult to find a person with 34 inches bust circumference and 28 inches underbust circumference, or it may be difficult to find a person with 34 inches bust circumference, 28 inches underbust circumference, and 30 inches waist measurement. Furthermore, "ideal" fit models that meet all standard measurement requirements may not be the most representative body shape for the size group. The approach of using a combination of tape measurements to define size categories for a sizing system can be problematic as the one combination being used to represent one size may not fit people who may be in between sizes. The methods and systems described herein can facilitate development of a sizing system for garments, such as form-fitting garments, that can provide a solution on how to select fit-models or prototype shapes based on the 3D shape of body parts (e.g., breasts), rather than a combination of body measurements.

Furthermore, the methods and systems described herein processes the 3D shape of the target body part, such as the breasts, from multiple individuals to optimize the sizing system. The body shape difference between an individual consumer and the fit model or prototype of their size can result in a fit-loss of certain degree. In an example, aggregate-fit-loss (AFL) is a concept that attempts to quantify and estimate the accumulative fit-loss that a population may encounter. However, very often the past estimated fit-loss are based on body measurements or tape measurements. The methods and systems described herein can provide a novel fit-loss function that calculates the dissimilarity between any two 3D body-scans, via pointwise comparisons of the point-to-reference point, such as an origin, distances of a fixed number of points on the scan surface. In addition, the methods and systems described herein utilizes an objective to minimize the AFL of a sizing system for garments, such as bras, through shape categorization and optimized selection of prototypes (e.g., the most appropriate fit models, or standard dress forms) for the categorized groups.

Still further, the methods and systems described herein can provide a solution for consumers to identify their own size. The methods and systems described herein can implement the points obtained from the surface of the 3D shape and the novel fit-loss function to correctly and quickly recommend sizes to consumers.

Also, the methods and systems described herein can provide a solution to improve existing bra sizing schemes. For example, the traditional band size can be used as a constraint along with the implementation of the novel fit-loss function to recommend sizes to consumer. Thus, the methods and systems can be integrated into existing sizing systems in a relatively convenient fashion.

FIG. 1A is a diagram illustrating a system 100 in accordance with aspects of the disclosure. In the example shown in FIG. 1A, a device 110 can receive a plurality of images 103 from a plurality of devices 101. The device 110 can be, for example, a computing device such as a server located in a data center. In an aspect of the disclosure, the computing device may be located in a store. In an aspect of the disclosure, the images 103 can be three-dimensional (3D) image. The plurality of devices 101 may be 3D scanners such as a mobile phone, a point of sale terminal, a 3D body scanner, a handheld 3D scanner, and a stationary 3D scanner, etc. The plurality of devices 101 can be located in the same or different locations from each other. In an aspect of the disclosure, the device 110 and the device 101 may be the same device. In other aspects, the plurality of devices 101 can be configured to be in communication with the device 110 through a network such as the Internet, a wireless network, a local area network, a cellular data network, etc. In some example, the images 103 can be 3D images resulting from a conversion of one or more two-dimensional (2D) images. For example, one of the devices 101 can be a mobile phone that can run an application to capture a plurality of 2D images and convert the captured 2D images into a 3D image. In some examples, the images 103 can be encrypted to preserve privacy of the owners of the images 103.

The device 110 can include a processor 112 and a memory 114. The processor 112 can be configured to be in communication with the memory 114. The processor 112 can be, for example, a central processing unit (CPU) or graphic processing unit (GPU) of the device 110, a microprocessor, a system on chip, and/or other types of hardware processing unit. The memory 114 can be configured to store a set of instructions 113, where the instructions 113 can include code such as source code and/or executable code. The processor 112 can be configured to execute the set of instructions 113 stored in the memory 114 to implement the methods and functions described herein. In some examples, the set of instructions 113 can include code relating to various image processing techniques, encryption and decryption algorithms, clustering algorithms, and/or other types of techniques and algorithms that can be applied to implement the methods and functions described herein.

Figure 1B:
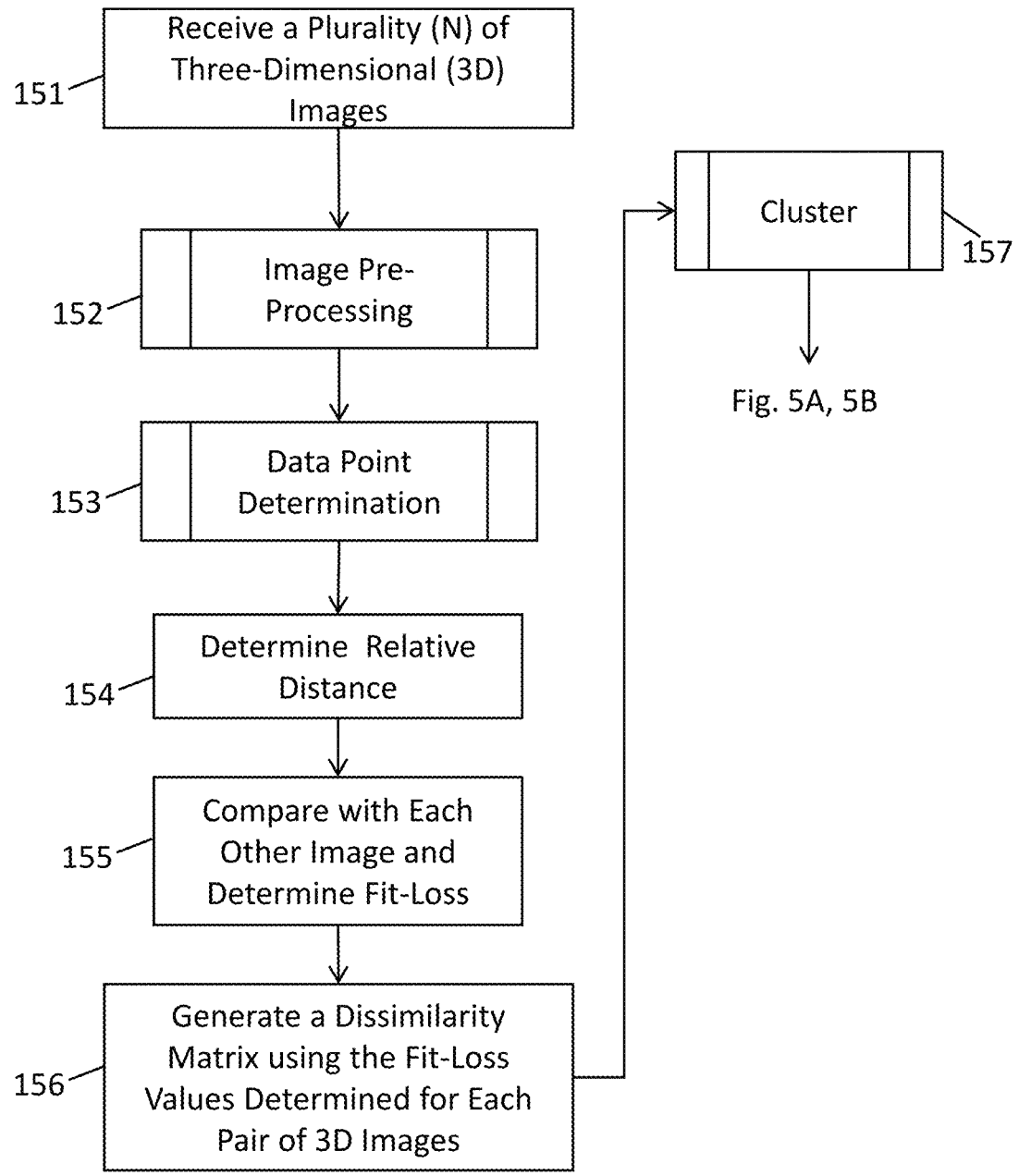
FIG. 1B is a diagram illustrating a process in accordance with aspects of the disclosure.

In an example, the processor 112 can execute the set of instructions 113 to perform a process 150 shown in FIG. 1B. Focusing on the process 150, at block 151, the processor 112 can receive a plurality of 3D images, such as N 3D images, from the devices 101. In an example shown in FIG. 1A, an image 104 among the images 103 can be sent from a device 102 to the device 110. The image 104 can be a 3D image of a body of an individual. The received images may be stored in the memory 114. The process 150 can proceed from block 151 to block 152, where the processor 112 can perform a series of image pre-processing steps. For example, in the example of FIG. 1A, the processor 112 can perform the series of pre-processing steps on the received image 104 (the pre-processing is performed for each received 3D image). The series of pre-processing steps are shown as a sub-process 160 in FIG. 1C.

Figure 1C:
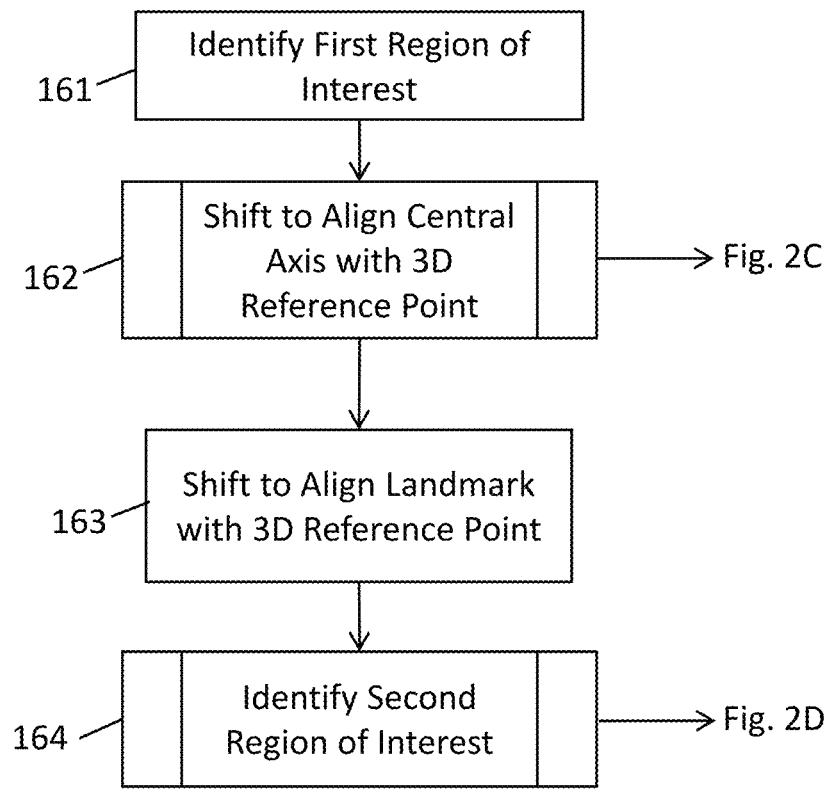
FIG. 1C is a diagram illustrating an example of a pre-processing of images in accordance with aspects of the disclosure.

In FIG. 1C, the sub-process 160 can begin at block 161, wherein the processor 112 can identify a first region of interest. The process 160 can proceed from block 161 to block 162, where the processor 112 can shift the first region of interest to align a central axis with a 3D reference point, where the central axis can be parallel to a longitudinal axis (201 in FIG. 2A) of a body being shown in the 3D image. In an example, the longitudinal axis can be referred to as an axis that runs lengthwise through the human body. The sub-process 160 can proceed from block 162 to block 163, where the processor 112 can shift the first region of interest to align with landmark feature(s) in the first region of interest with the 3D reference point. The sub-process 160 can proceed from block 163 to block 164, where the processor 112 can identify a second region of interest. For example, the second region of interest may be a portion of the first region of interest. In other aspects, the processor 112, can identified the second region of interest directly from the received image. As noted above, the processor 112 can perform the pre-processing steps 152 and the sub-process 160 on each one of the received images 103. The details of block 162 and block 164 are being shown in FIG. 2C and FIG. 2D, respectively.

Returning to FIG. 1B, the process 150 can proceed from block 152 to block 153, where the processor 112 can perform a data point determination. For example, in the example shown in FIG. 1A, the processor can identify a number of data points on a surface of the second region of interest. The process 150 can proceed from block 153 to block 154, where the processor 112 can determine relative distances between each identified data point and the reference point. For example, the processor 112 can determine distances between each identified data points in block 153 and the reference point. The process 150 can proceed from block 154 to block 155, where the processor 112 can compare the determined distances of every possible pair of images among the N 3D images to determine fit-loss values for pairs of images. For example, in FIG. 1A, the processor 112 can determine fit-loss values between every possible pair of images among the images 103.

Figure 4:
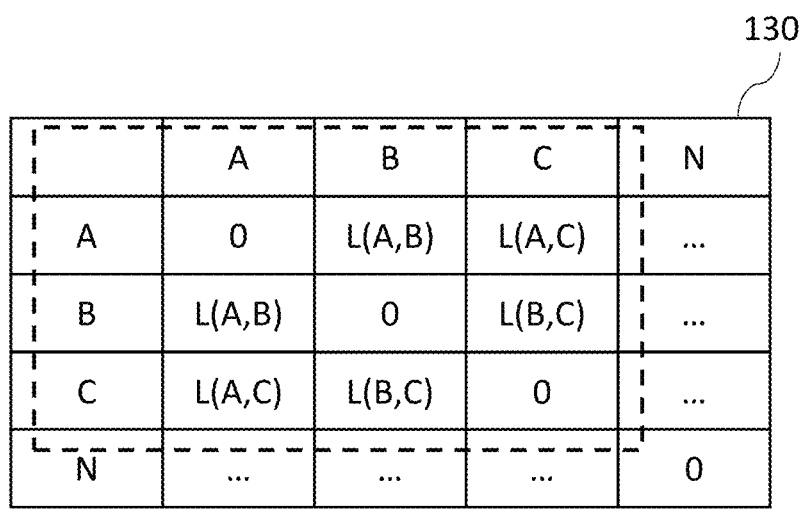
FIG. 4 is a diagram illustrating a dissimilarity matrix in accordance with aspects of the disclosure.

The process 150 can proceed from block 155 to block 156, where the processor 112 can generate a dissimilarity matrix using the fit-loss values determined for the all possible combinations of pairs of the N 3D images. The dissimilarity matrix can indicate discrepancies between every possible pair of images among the images 103. An example of a dissimilarity matrix is represented in FIG. 4. The process 150 can proceed from block 156 to block 157, where the processor 112 can cluster the N 3D images into groups based on the dissimilarity matrix. Details of the block 157 can be found in, for example, FIGS. 5A-5B. The processor 112 can define a sizing system 140 for a body part being shown in the images 103 based on the clustered groups. The processor 112 can store the sizing system 140 in the memory 114. Each group can represent a size for the body part, and each group can be represented by a prototype shape or image that can be identified by the processor 112. In an example, each image among the images 103 can be a 3D image of a woman, the first region of interest identified from the image can be a torso of the woman, and the second region of interest can show a body part such as the woman's breasts. The sizing system 140 based on the clustered groups resulting from images 103 can be a sizing system for form-fitting garment for the breasts, such as bras.

Figure 2A:
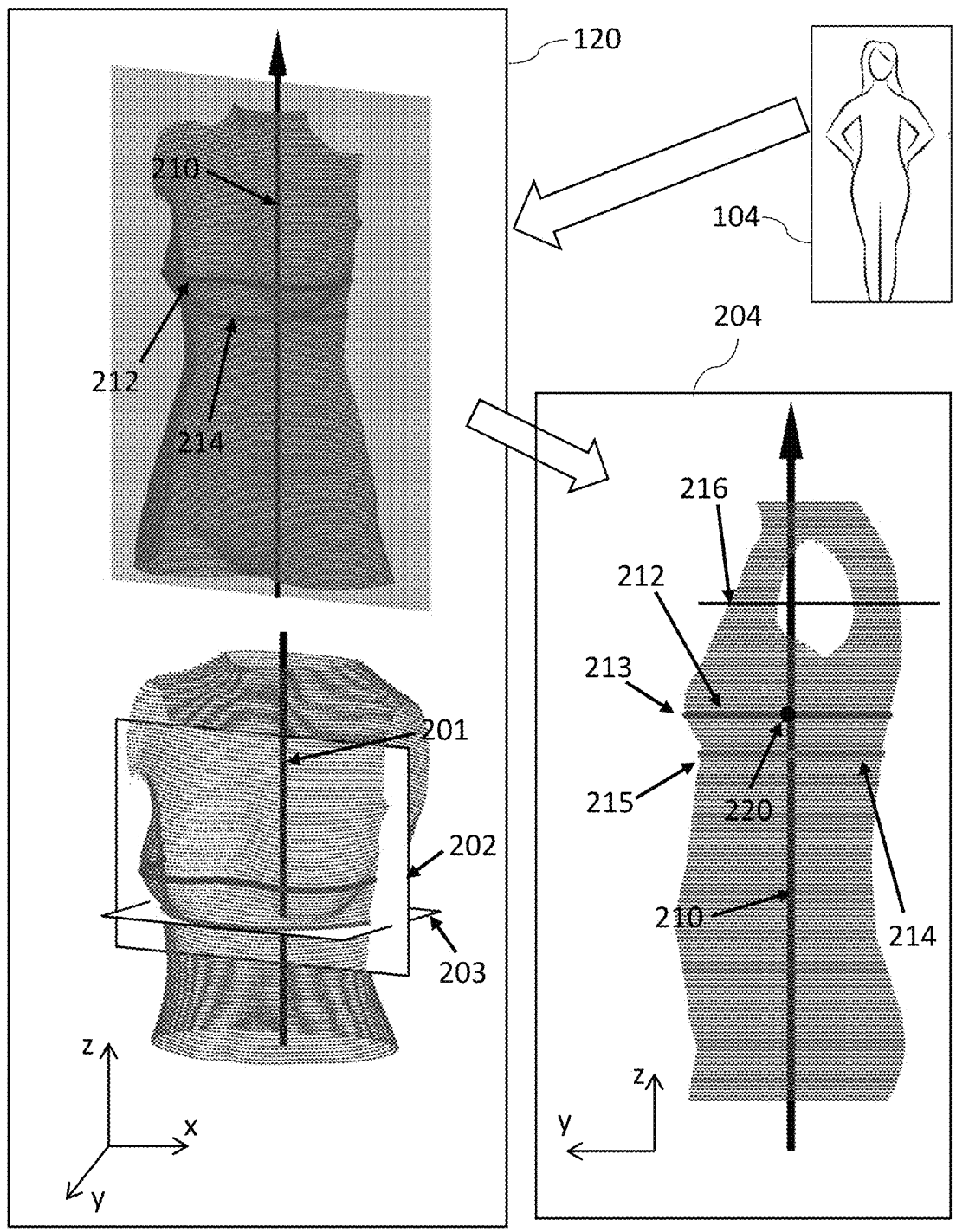
FIG. 2A is a diagram illustrating an example of a first region of interest and pre-processing the first region of interest in accordance with aspects of the disclosure.

FIG. 2A is a diagram illustrating an example of a first region of interest 120, a central axis, and certain lines in the image in accordance with aspects of the disclosure. In an example, in response to receiving the image (such as image 104), the processor 112 can execute instructions 113 to identify the first region of interest 120 by performing data cleaning, such as removing noisy image points, removing the limbs, neck, and head. In an aspect of the disclosure, the pre-processing may also include rotating the received 3D image to a specific rotation or direction. For example, the 3D images may be rotated such that the image are upright and face frontward. This identification of the first region of interest 120 is based on a target body part and the specific body parts removed may be different for different body parts. The example of the first region of interest 120 is shown where the target body part is the breasts. However, when the target body part(s) are parts related to a shirt, the neck and arms may remain. The head and legs may be removed. In the example shown in FIG. 2A, the first region of interest 120 can include a 3D image of, for example, a torso of a woman including a pair of breasts. In an aspect of the disclosure, the first region of interest 120 can be projected onto 3D Cartesian coordinates defined by the x-axis, the y-axis, and the z-axis shown in FIG. 2A. However, the coordinate system is not limited to Cartesian and other coordinate systems may be used. The processor 112 can identify a central axis 210 in the first region of interest 120, and align the central axis 210 to a 3D reference point, the processor 112 can perform the shifting in block 162 of FIG. 1C. FIG. 2C shows an example of a process 250 to perform the shifting in block 162 of FIG. 1C. In FIG. 2C, the process 250 can include a block 251, where the processor 112 can determine an average with respect to a first direction. For example, the processor 112 can average the x-components of all the image points of the first region of interest to determine a first average value. The process 250 can proceed from block 251 to block 252, where the processor 112 can determine an average with respect to a second direction. For example, the processor 112 can average the y-components of all the image points of the first region of interest to determine a second average value. The central axis 210 can be defined as an axis intersecting the first average value and the second average value. As shown in the example of FIG. 2A, the central axis 210 can be orthogonal to the x-y plane and parallel to the x-z plane and the y-z plane (e.g., vertical).

The process 250 can proceed from block 252 to block 253, where the processor 112 can shift the first region of interest 120 such that the central axis can intersect the reference point, such as the origin. This effectively causes the average values to move to the reference point. For example, the processor 112 can shift the first region of interest 120 horizontally (e.g., along the x-y plane or a transverse plane 203 orthogonal to the longitudinal axis 201 of the body) until the central axis 210 is aligned with the x-component and the y-component of a (3D) reference point 220. In some examples, the transverse plane 203 can be referred to as a plane that divides the body into superior and inferior parts. The reference point 220 is shown in a side view 204 of the first region of interest 120. In an example, the reference point 220 can be an origin (e.g., coordinates (0, 0, 0)) of the 3D Cartesian coordinate system). Thus, the horizontal shifting can be performed to make the central axis 210 defined by the averaged x-coordinates and y-coordinates of all image points on the first region of interest, aligned or coincided with x=0 and y=0. Process 152 is performed for each received 3D image 103.

The processor 112 can shift the first region of interest 120 vertically (e.g., up or down the z-axis or along the longitudinal axis of the body) to make the bust plane 212 align with the z-component of the reference point 220. In an example, the bust plane 212 can be defined by averaging the z-components of at least one landmark feature 213 (e.g., left and right nipples), and aligning the bust plane with the averaged z-component. The vertical shifting can be performed to make the bust plane 212 coincided with z=0. After the horizontal and vertical shifting, the central axis 210 and the bust plane 212 can be aligned with the reference point 220, as shown in the side view 204. In an aspect of the disclosure, the order of the shifting may be reverse.

Figure 2B:
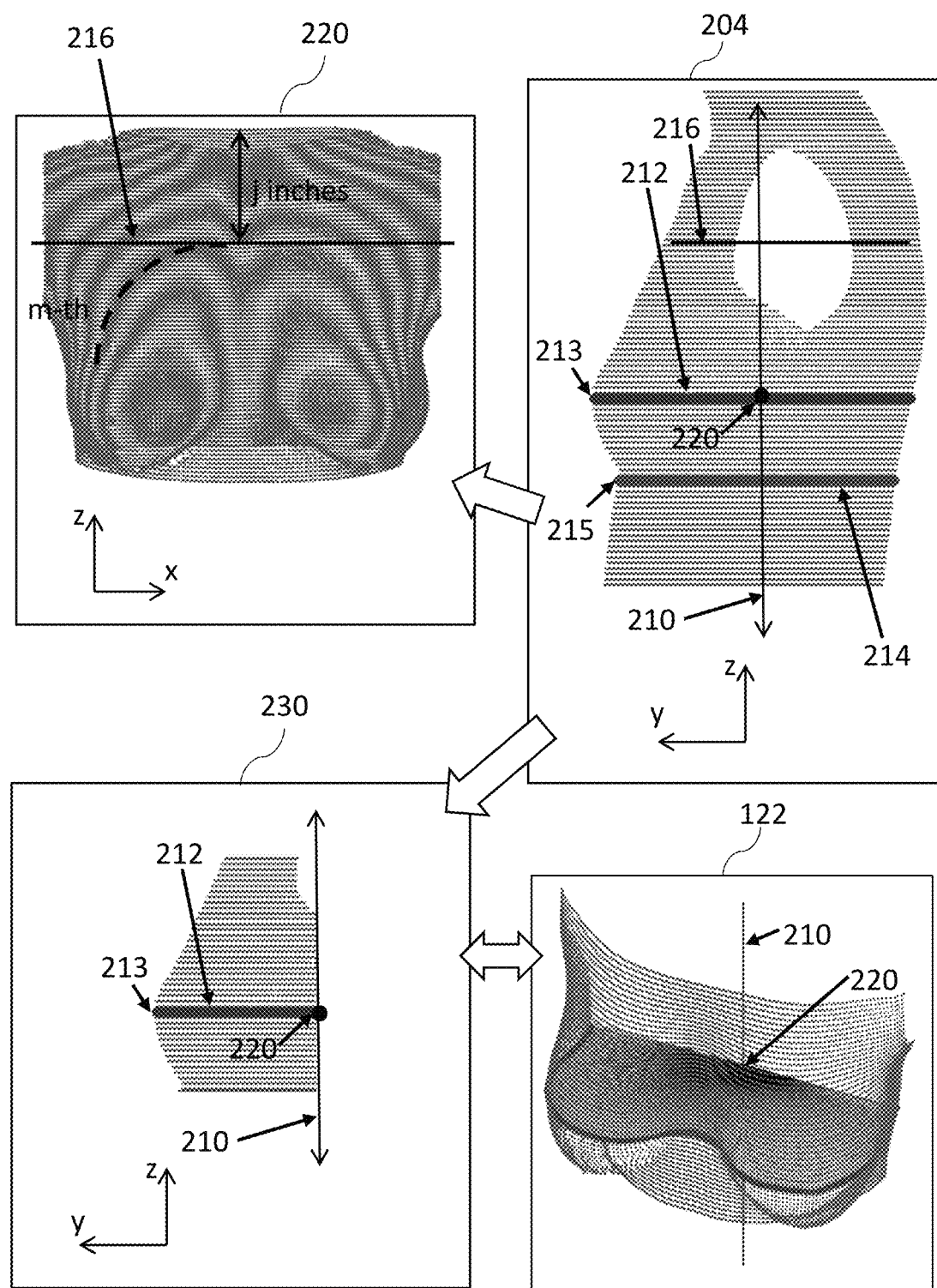
FIG. 2B is a diagram illustrating an example identifying a second region of interest in accordance with aspects of the disclosure.
Figure 2C:
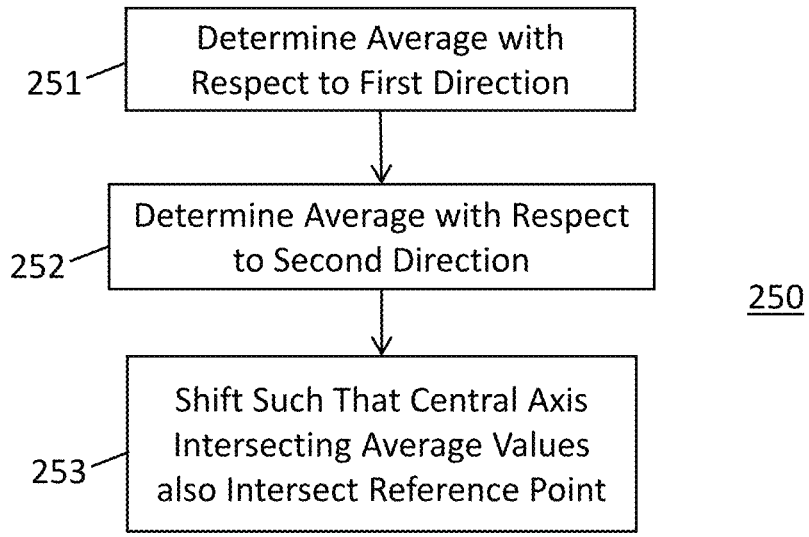
FIG. 2C is a diagram illustrating a process for shifting in accordance with aspects of the disclosure.
Figure 2D:
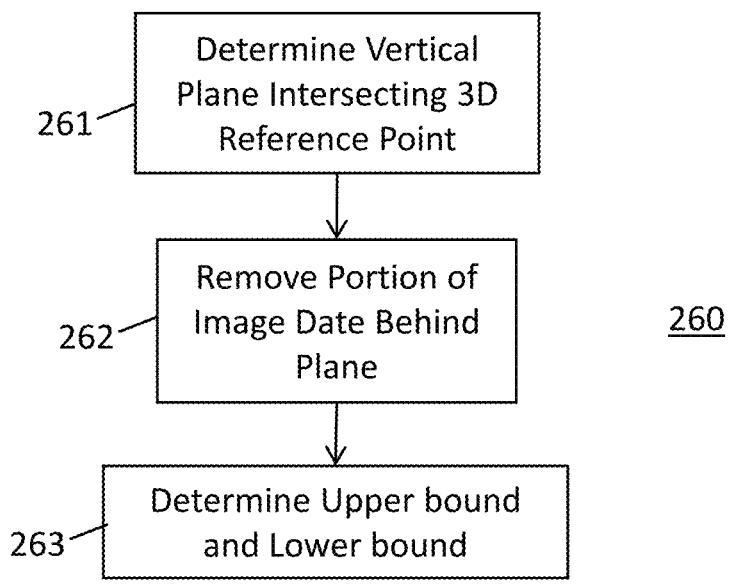
FIG. 2D is a diagram illustrating process for identifying the second region of interest in accordance with aspects of the disclosure.

FIG. 2B is a diagram illustrating an example of an identification of a second region of interest in accordance with aspects of the disclosure where the second region includes the breasts. Upon aligning the central axis 210 and the bust plane 212 with the reference point 220, the processor 112 can perform block 164 of FIG. 1C to identify the second region of interest 122. FIG. 2D shows an example of a process 260 to perform the block 164 of FIG. 1C to identify the second region of interest 122. In FIG. 2D, the process 260 can start at block 261, where the processor 112 can determine the vertical plane intersecting the 3D reference point, such as the x-z plane (e.g., y=0). In some aspects, depending on the target body part, blocks 261 and 262 may be omitted. The process 260 can proceed from block 261 to block 262, where the processor can remove a portion of image data behind the x-z plane. In the example shown in FIG. 2B, a posterior portion of the first region of interest (e.g., all image points in y<0) can be removed. The posterior portion of the first region of interest can be removed before or after identifying an upper bound 216 and a lower bound 214. In an example, the vertical x-z plane can be parallel to the nipples in the first region of interest and can intersect the reference point 220, such that the 3D image of the breasts is located on an anterior side (e.g., positive side) of the x-z plane. The processor 112 can identify a posterior size (e.g., negative side), opposite to the anterior side, of the x-z plane and remove all image points located on the posterior side of the x-z plane. In another example, the processor 112 can identify a plane that intersects the 3D reference point 220 and that is parallel to a coronal (or frontal) plane 202 of the body. The image points between this identified plane and a back of the body can be removed to identify the second region of interest 122. In some examples, the coronal plane can be referred to as a plane running from side to side, and divides the body or any of its parts into anterior and posterior portions.

The process 260 can proceed from block 262 to block 263, an upper bound and a lower bound of the second region of interest. In the example shown in FIG. 2A, the upper bound 216 and the lower bound 214 can define a top and bottom border of the second region of interest 122. In some examples, a user operating the system 100 can visually define the upper bound 216 and the lower bound 214. In some examples, the processor 112 can execute the instructions 113 to identify the locations of the upper bound 216 and the lower bound 214. When the breast is the target body part, to focus on the breast shape, the portions of the first region of interest 120 below an underbust line (e.g., lower bound 214), and above the upper boundary of the breasts (e.g., upper bound 216) can be removed. In an example shown in FIG. 2B, the processor 112 can rotate the first region of interest 120 to different angles until an angle is reached where Moiré patterns are formed or visible on a particular plane, as shown in a view 220 in FIG. 2B. The instructions 113 can include a criterion for the processor 112 to identify the upper bound 216 based on the Moiré patterns. For example, the instruction can define the upper bound 216 as a horizontal line tangent to an upper edge of an m-th contour as shown in FIG. 2B. In some examples, a separation height, such as "j inches" in view 220, or a percentage of a body height or of a upper torso length, can be determined by the processor 112 and the section below this separation height can be kept for the second region of interest 122. In some examples, the separation height can be defined by the instructions 113. The processor 112 can further identify the lower bound 214 by identifying an immediate crease 215 of a protruded region in the first region of interest to identify the lower bound 214 of the second region of interest 122. Upon removing the posterior portion of the first region of interest 120, removing portions above the upper bound 216, and removing portions below the lower bound 214, the second region of interest 122 can be identified. FIG. 2B shows the 3D image of the second region of interest 122 and a side view 230 of the second region of interest 122. The blocks 262 and 263 can be performed in any arbitrary order.

Figure 3A:
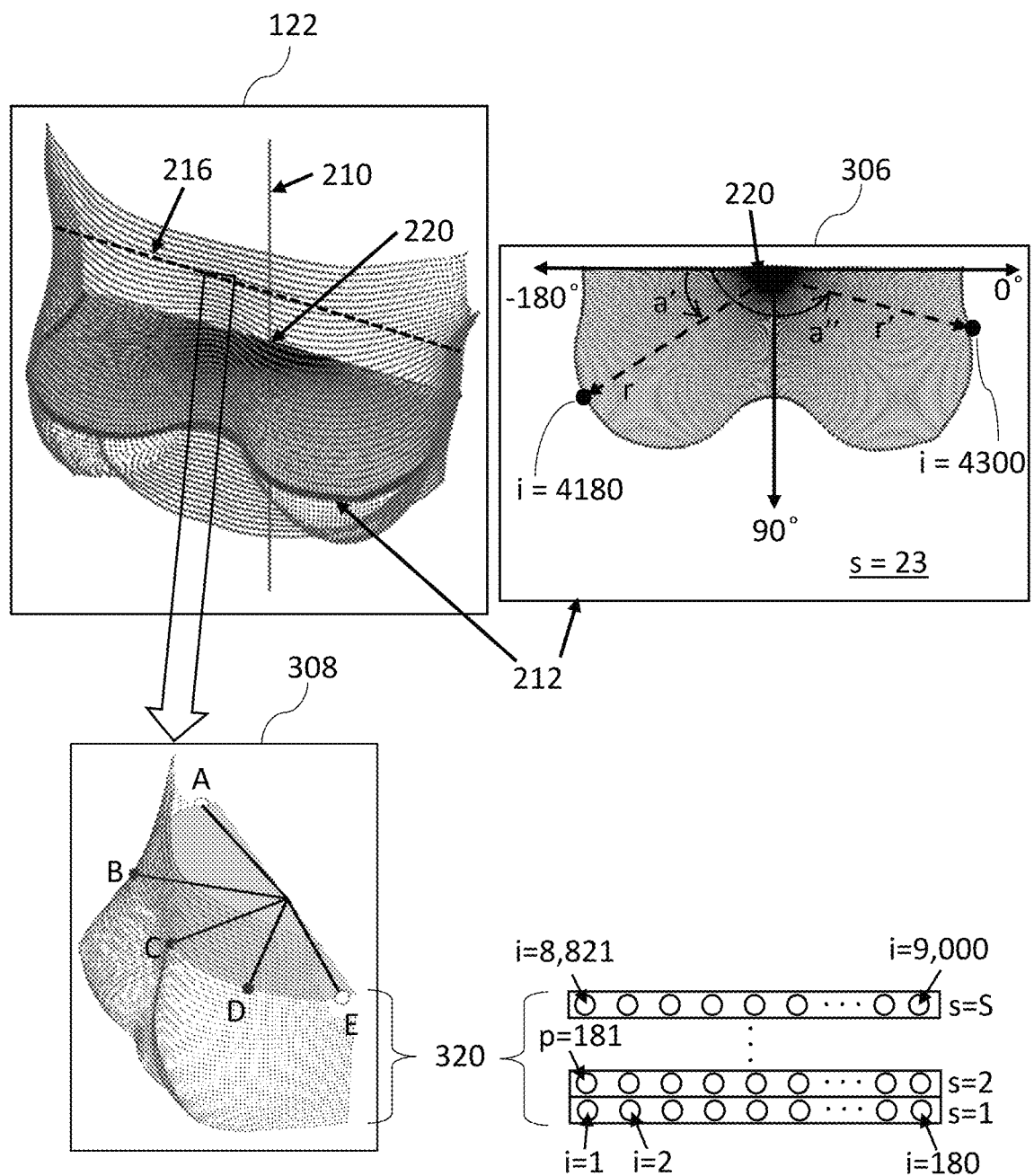
FIGS. 3A-3B are a diagram illustrating an example of the identification of data points on a surface in accordance with aspects of the disclosure.

FIG. 3A is a diagram illustrating an example of the identification of data points on a surface in accordance with aspects of the disclosure. In FIG. 3A, the target body part is the breasts, the data points are on the surface of the breasts. The processor 112 can process the second region of interest 122 to identify a fixed number of data points, such as P data points, on a surface of the second region of interest 122. For example, P can be 9,000 ranging from i=1 to i=P, such that the processor 112 can identify 9,000 points on a surface of the second region of interest 122 for each and every image among the images 103. The 9,000 points can be arranged to be identified in the same order without distorting the scan performed by the processor 112. The number 9,000 is described for descriptive purposed only and other fixed number of data points may be used.

For each image, the processor 112 can partition the second region of interest 122 into S equally distributed horizontal slices 320. In some examples, the horizontal slices can be orthogonal to the longitudinal axis of the body. The S horizontal slice can be arranged by their z-coordinates, such as from bottom to top or from s=1 to s=S. The thickness of the horizontal slices can be the same within the same second region of interest 122, but can be different among different images 103. For example, a first image and a second image can each have 50 horizontal slices of identical thickness, but the thickness of the horizontal slices of the first image can be different from that of the second image. The number of horizontal slices is not limited to 50 and 50 is for descriptive purposes only. Further, a fixed number of points, such as 180 points, can be identified on each horizontal slice in each image, e.g., 1 point per degree. However, in other aspects of the disclosure, there may be more points per degree. In other aspects, there may be one point per 5 degrees. This may depend the target body part.

In an example, to identify 180 points, the processor 112 can identify the data points on a horizontal slice from $-180°$ to $0°$, at angle increments of $1°$, as shown in a view 306 in FIG. 3A. In other words, starting from $-180°$ to $0°$ ($-n$ to 0) there may be one data point identified at every degree. For example, the 1st point can be a point i=1 located at the bottommost slice s=1, at the angle of $-180°$. The 10th point is the point i=10 located on the bottommost slice s=1, at the angle of $-171°$. Focusing on the view 306, the bust line (z=0) can be, for example, the horizontal slice s=23, such that a data point i=4180 can be located at a distance r at an angle a' from $-180°$ and another data point i=4300 can be located at a distance r' at an angle a'' from $-180°$. The x-, y-, z-coordinates of the data points i can be determined by the processor 112 and recorded in sequence ranging from i=1 to i=9,000, and the recorded locations or coordinates can be stored in the memory 114.

In an example, if a certain image point is missing in the first or second region of interest, its coordinates can be defined or replaced by undefined values, such as not-a-number (NaN) values, to hold the space for the point, and to maintain the sequence and indexing of other points among i=1 to i=9,000. The missing points can be a result of the removal of limbs (e.g., arms) when identifying the first region of interest 120, and the missing points can be at locations such as the arm holes where the arms were removed. Using a view 308 of the second region of interest 122 as an example, the topmost slice s=S can include the data points from i=8,821 to i=9,000, and a plurality of points A, B, C, D, E can be among these data points on slice s=S. Points A and E can be the data points i=8,821 and i=9,000, respectively. The points A and E can be located at the armhole area where the arms were removed, and thus, the points A and E can be replaced with undefined values. Further, by replacing the point A with undefined values, the processor 112 may not skip the point i=8,821 in response to failing to identify a pixel value or image point, causing the sequence from i=1 to i=9,000 to be maintained. As described above, the identification of 9,000 data points from 50 horizontal slices, and 180 points at 1° increments on each horizontal slice, is merely an example. Other numbers of data points can be identified from other amounts of horizontal slices and angle increments, depending on a desired implementation of the system 100 such as the type of target body part.

Figure 3B:
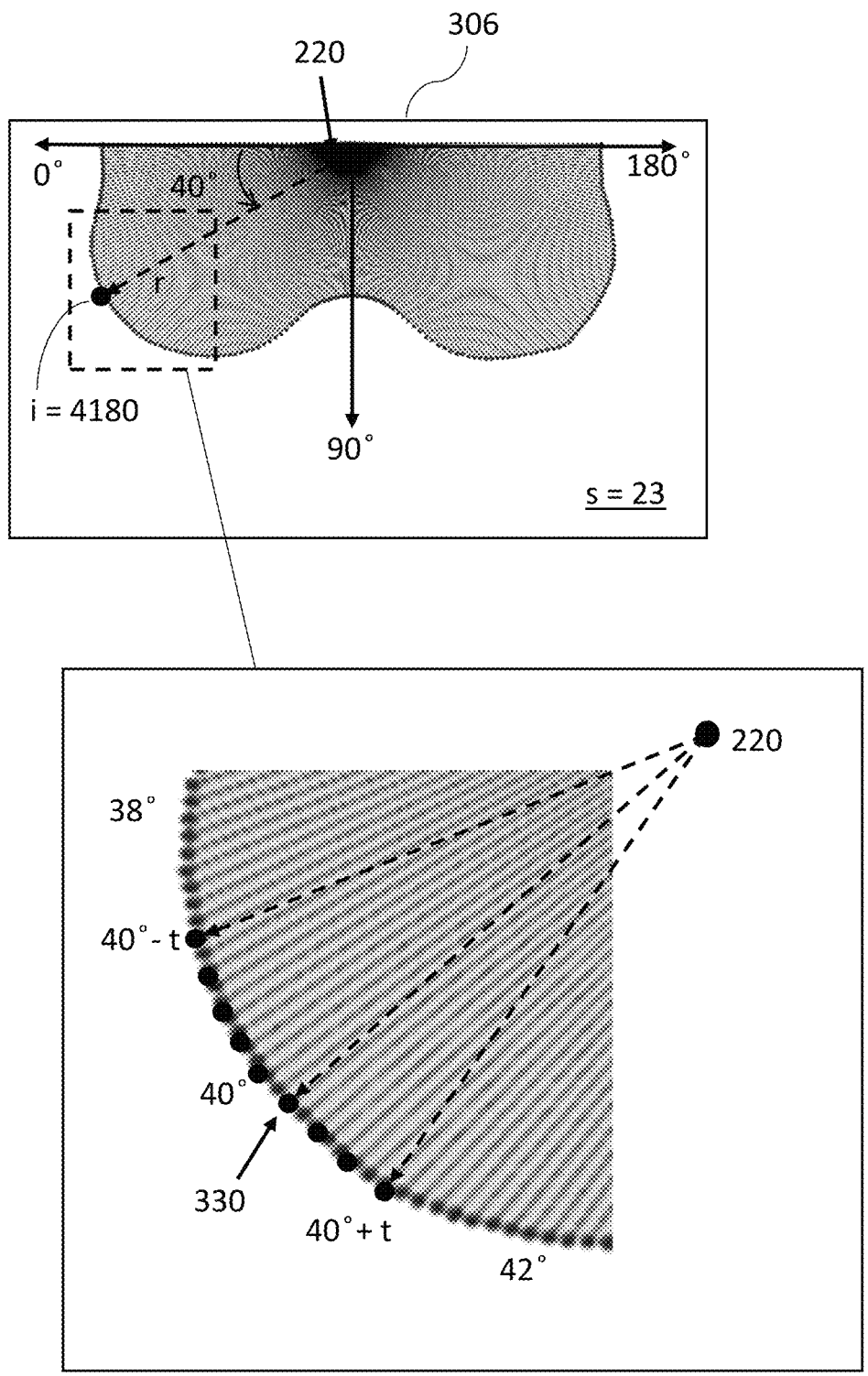
Figure 3C:
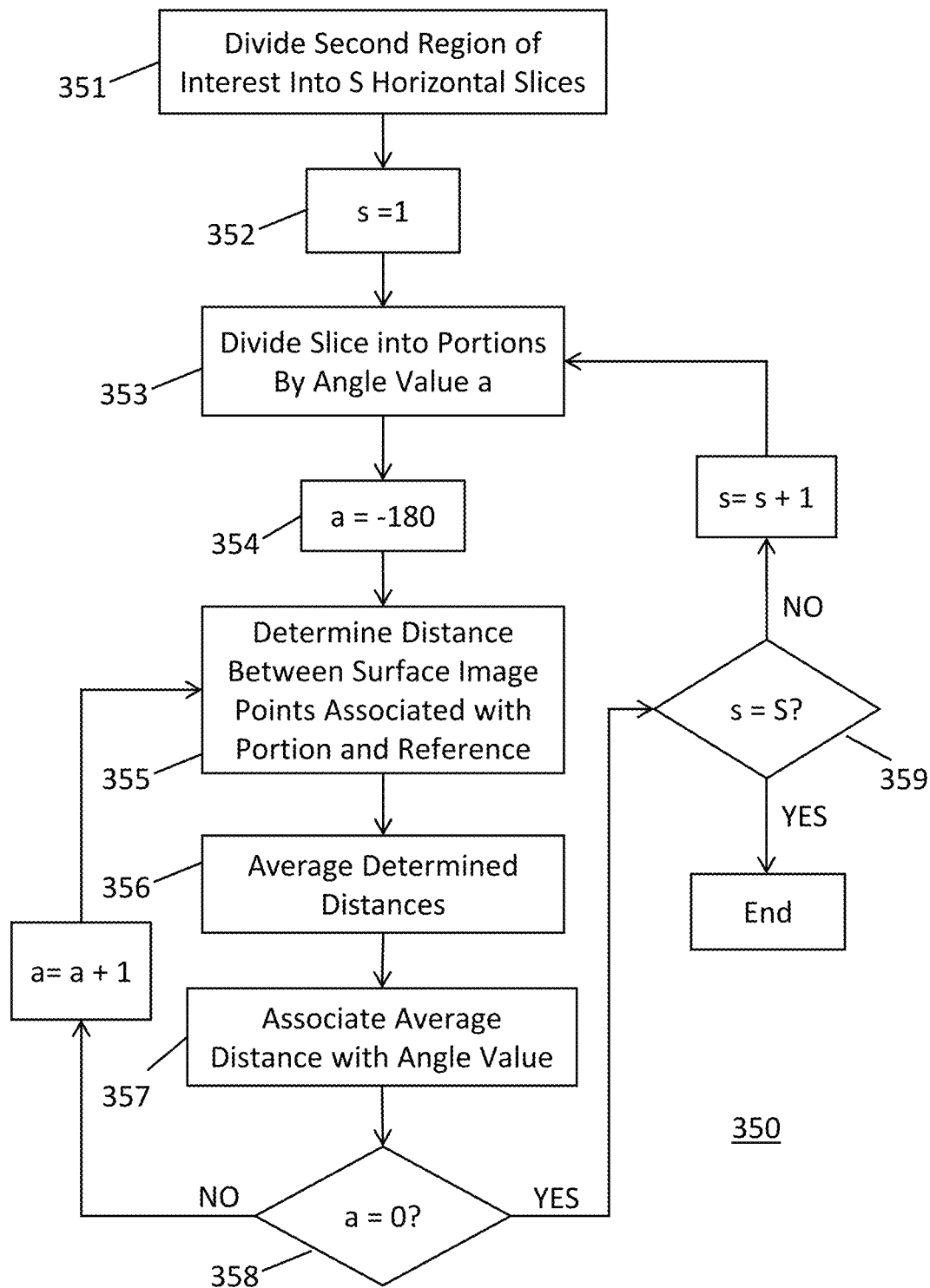
FIG. 3C is a diagram illustrating a process to identify data points in accordance with aspects of the disclosure.

FIG. 3B is a diagram illustrating additional details of the identification of data points on a surface in FIG. 3A in accordance with aspects of the disclosure. In an example, to identify the 180 data points on each horizontal slice, the processor 112 can execute a process 350 shown in FIG. 3C to "sweep" across a horizontal slice from −180° to 0°, at 1° increments (preset increments), to identify the 180 data points. The process 350 can being at block 351, where the processor 112 can partition or divide the second region of interest into S horizontal slices. The process 350 can proceed from block 351 to block 352, where the processor 112 can initialize a value of s to 1 to begin a sequence to identify the data points from the bottommost horizontal slice (s=1). The processor may include a counter to count the processed sliced. In other aspects, the processor may use a pointer or flag to identify the slice.

The process 350 can proceed from block 352 to block 353, where the processor 112 can partition or divide the horizontal slice s into a plurality of portions represented by an angle value a. To improve an accuracy of the x-, y-, z-coordinates of the location of the 180 data points, the instructions 113 can define a threshold t corresponding to an angle tolerance of each data point. For example, for an angle value a=40° and threshold t=1.5, the processor 112 can partition each horizontal slice s into a plurality of portions based on a fixed angular interval defined by the angle value a and the threshold t. For example, each portion can range from an angle a−t to a+t. As shown in the example in FIG. 3B, a portion represented by the angle a=40° can range from 38.5° to 41.5°, and the portion can include multiple image points.

The process 350 can proceed from block 353 to block 354, where the processor 112 can initialize the angle value a to a=−180°. The process 350 can proceed from block 354 to block 355, where the processor 112 can determine distances between images points along the horizontal slice s and the reference point (all image points at the angle and within the tolerance). The process 350 can proceed from block 355 to block 356 where the processor 112 can determine an average of the distance determined in block 355. For each portion, the processor 112 can determine the distances of the multiple image points from the reference point 220, and determine an average among these determined distances. The process 350 can proceed from block 356 to block 357, where the processor 112 can associate an image point having the average distance determined at block 356 with the angle value a. In the example shown in FIG. 3B, the processor 112 can identify an image point 330 located at the average distance and the angle 40.05° from with respect to the reference point 220. The processor 112 can set this image point 330 as the data point i=4,179 represented by the angle value a=40°. The value of the image points and associated angle (and slice) may be stored in memory 114.

The process 350 can proceed from block 357 to block 358, where the processor 112 can determine whether the angle value a is zero or not. In other aspects, instead of started at 180 degrees going down to zero, the process may start at zero degrees may increment up to 180. If the angle value a is not 0, the processor 112 can increment the value of a by one (e.g., −180+1=−179) and the process 350 can return to block 355, where the processor 112 can perform the blocks 355, 356, 357 for a next portion in the same horizontal slice. At block 358, if the angle value a is 0, the process 350 can proceed to block 359, where the processor 112 can determine whether the slice s is the fixed number S (e.g., 50). If the slice s is not equal to S, then the processor 112 can increment s by one to and the process 350 can return to block 353, where the processor 112 can perform the blocks 353, 354, 355, 356, 357, 358 for a next horizontal slice. If the value of s is S (e.g., 50), that means all horizontal slices are processed and the processor 112 can end the process 350. In other aspects of the disclosure, the processing may begin with the highest number slice and work downward instead of beginning with slice S=1 and worked upward.

FIG. 4 is a diagram illustrating a dissimilarity matrix that can be used for clustering in order to determine the size or shape groups in accordance with aspects of the disclosure. Upon pre-processing each image among the images 103, the processor 112 can determine fit-loss values between every possible pair of images among the images 103. The processor 112 can further generate a dissimilarity matrix 130 based on the determined fit-loss values, where the dissimilarity matrix 130 can indicate discrepancies between every possible pair of images among the images 103.

In a known system, fit-loss values were calculated using body measurements such as circumferences, lengths, etc. However, due to the complexity of the breast shape, the traditional breast measurements may not fully describe the concavity, convexity and subtle fluctuations on the breast surface, all of which may significantly influence the morphology of breast. In addition, the extraction of body measurements depends on the actual placement of body landmarks, but the definition and identification of landmarks can be a real challenge on the soft breast tissue (where bust point may be an exception).

Rather, in accordance with aspects of the disclosure, the identification of data points on a surface of the second region of interest 122 using the predefined sequence described above, with respect to FIGS. 3A-3C, can provide direct usage of the locations of points on the scan surface (e.g., the surface scanned by the device 101 or 3D scanners), with respect to the 3D reference point 220 (e.g., an origin (0, 0, 0)). Since the coordinates or locations of the data points are sorted into the same order (e.g., from i=1 to i=9,000, from the bottommost slice to the topmost slice, and from −180° to 0° on each slice) the need for body landmarks during body measurements may be avoided. Since horizontally all the scans had been shifted to center at x=0 and y=0, and vertically the bust point level now locates at z=0, each point's distance from the origin (0,0,0) can be calculated by the following equation (Eq. 1):

$$d_i = \sqrt{x_i^2 + y_i^2 + z_i^2} \quad \text{(Eq. 1)}$$

where, $(x_i, y_i, z_i)$ is the coordinates of the i-th point among the scan-surface points (i ranges from 1 to 9,000), and $d_i$ is the distance of the i-th point from the origin (0, 0, 0) or the reference point 220. If the coordinates of a point includes undefined (e.g., NaN) values, the distance of that point from the reference point will be recorded as NaN.

Based on the calculated distances from Eq. 1, a pairwise fit-loss function between any two scans (e.g., a pair of images among images 103) is given by the following equation (Eq. 2):

$$L(d1, d2) = \frac{1}{m} \sum_{k=1}^{n} (d1_i - d2_i)^2 \quad \text{(Eq. 2)}$$

where d1, d2 represent two different images or scans, d1i refers to the i-th point on the first scan or image, while d2i refers to the same i-th point on the second scan or image. The variable n is the total number of points, which in the examples described here, is 9,000. Any value subtracting or being subtracted by an NaN value will result in an NaN value, but all the NaN values can be removed by the processor 112 before the addition. The variable m is the total number of pairs of points where both points do not include undefined values.

Eq. 2 is an example, of a dissimilarity function that quantifies the shape difference between two images or scans. If one of the two scans is chosen to be a prototype of a shape (e.g., target body part shape), the equation calculates the amount of fit-loss of the other scan. The processor 112 can generate the dissimilarity matrix 130 based on the determined pairwise fit-loss values for each pair of images.

For example, if there are 4 3D images, there are 4C2 different possible fit-loss values. For example, where there are image A, image B, image C and image D, the combinations are AB, AC, AD, BC, BD, CD. The dissimilarity matrix 130 would be a 4×4 matrix and would be symmetric about the diagonal (e.g., L(d1, d2)=L(d2, d1)), and values on the diagonal are uniformly zero, because the fit loss of a scan to itself is zero (e.g., L(d1, d1)=0). For example, the pairwise fit-loss value for the pair A-A, or L(A, A) is 0 since the image A is being compared with itself and dissimilarity is absent. The larger the fit-loss value is between a pair, the more dissimilar the pair is in shape. The processor 112 can populate entries of the dissimilarity matrix 130 with the pairwise fit-loss values determined based on Eq. 2, such as L(A, B), L(A, C), etc., for each pair of images among the images. As shown in FIG. 4, there are N number of 3D images. For descriptive purposes, only image A, image B, image C and image N are shown, however, the matrix would include the fit-loss values for all N images.

The processor 112 can determine an aggregate-fit-loss (AFL) from the dissimilarity matrix 130. The AFL is a sum of the fit-loss values of members of a group with respect to a specific prototype for the group where the images are compared with the specific prototype. For example, if a clustering result (the clustering will be described in more detail below) groups the images A, B, C, in the same shape group and A is assigned as the prototype shape of this group, then the AFL can be obtained by adding up the values in rows 2 and 3 of column 1 as shown in the matrix 130 in FIG. 4. Then, the processor 112 can determine an overall AFL summing the each within-group AFL of all the groups. In an example, the overall AFL can be reduced by categorizing the body part in the images (e.g., breasts) into appropriate groups (described below). Therefore, the AFL can be used by the processor 112 to identify prototype in each group and the overall AFL can be used to identify a clustering algorithm that can result in an optimal distribution of the images 103 into different groups and well as the number of groups for the sizing scheme.

Figure 5A:
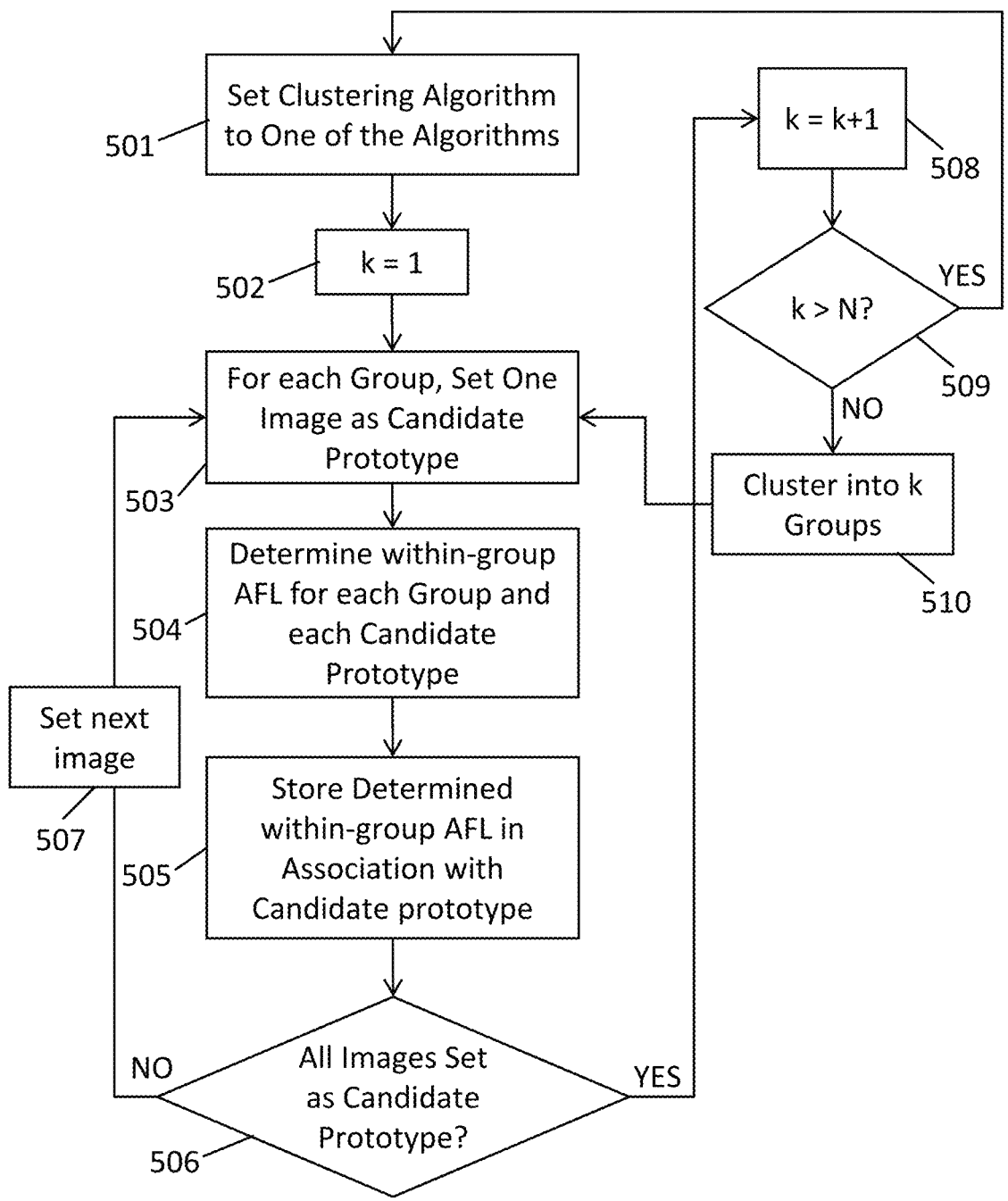
FIG. 5A is a diagram illustrating a process to determine different clustered groups in accordance with aspects of the disclosure.

FIG. 5A is a diagram illustrating a process 500 to determine different clustered groups that can be used to cluster a plurality of images into groups in accordance aspects of the disclosure. In an example, the processor 112 can run more than one clustering algorithms on the dissimilarity matrix 130 to generate different combinations of groups based on a parameter k, where the parameter k indicates a number of groups. For example, for a particular value of k, the N images can be distributed into k groups, where each group can have an arbitrary number of images (as long as the sum of all images is N). If k=1 then all N images will be clustered into the one group, and if k=N, then there will be one image in each one of the N groups. The processor 112 can identify a clustering algorithm among the more than one clustering algorithms to cluster the images 103 based on a criterion relating to the different combinations of groups. For each clustering algorithm, and for each k, the processor 112 can identify a prototype for each group in the k groups, and determine the overall AFL for each value of k. The processor can compare the determined overall AFL for all values of k and identify one clustering algorithm.

The processor 112 can execute the process 500 to determine overall AFL values for all values of k, and for multiple clustering algorithms, in order to identify or choose a clustering algorithm (and cluster the images). The process 500 can begin at block 501, where the processor 112 can set one clustering algorithm, out of more than one clustering algorithm, to be used on the dissimilarity matrix 130. For example, K-medoid clustering and Hierarchical clustering (including Ward's method, Complete-linkage clustering, or Centroid-linkage clustering) are among some of the clustering algorithms that can be used to cluster the images using the dissimilarity matrix 130. The process 500 can proceed from block 501 to block 502, where the value of k can be initialized to k=1. As described above, when k=1, all N images will be clustered into the one group. The process 500 can proceed from block 502 to block 503, where the processor 112 can, for each group, set one image as a candidate prototype image. If k=1, then one of the N images can be set as a candidate prototype image.

The process 500 can proceed from block 503 to block 504, where the processor 112 can, for each group, determine the within-group AFL (and across the groups) based on the candidate prototype image set at block 503 as described above, e.g., adding the fit loss for each pair of images in the group where the candidate prototype is one of the images in the pair. In the first pass, the within-group AFL is equal to the overall AFL since there is only one group. The process 500 can proceed from block 504 to block 505, where the processor 112 can store the determined within-group AFL in associated with the candidate prototype image. The process 500 can proceed from block 505 to block 506, where the processor 112 can determine whether all images in each group have been set as candidate prototype image or not. If all images in all groups have been set as candidate prototype image, the process 500 can proceed to block 508. If not all images in all group(s) have been set as candidate prototype image, the process 500 can proceed to block 507 where a next candidate prototype image can be set, and the processor 112 can perform the blocks 503, 504, 505 for the next candidate prototype image and its respective group. In the example where k=1, since there is only one group and N images in the one group, the loop including blocks 503, 504, 505, can be performed N times.

At block 508, the processor 112 can increment the value of k, such as from k=1 to k=2 such that the images are now grouped into two groups. The process 500 can continue from block 508 to block 509, where the processor 112 can determine whether the incremented value of k is greater than N. If k is less than N, then the processor 112 can use the clustering algorithm set at block 501 to cluster the k groups at block 510. The process can return to block 503 from block 510, such that the processor 112 can perform the blocks 503, 504, 505 506, 507 for the incremented value of k. If k is greater than N, then the process 500 can return to block 501, where the processor 112 can set a next clustering algorithm and repeat the process 500 using the next clustering algorithm.

Upon performing the clustering at block 510 for all clustering algorithms, and for all values of k, the processor 112 can determine the overall AFL for each value of k and each clustering algorithm. This is done once the prototypes have been determined for all groups and all values of k. In an example, the processor 112 can determine a prototype of a group by setting each image within the group as candidate prototype, then determine a within-group AFL value of the group for each candidate prototype. The processor 112 can identify the candidate prototype that results in the lowest within-group AFL as the prototype image. The processor 112 can be configured to analyze resulting overall AFL values from different clustering algorithms and identify the clustering algorithm that results in the lowest overall AFL for more than one K. In some examples, the prototypes for each group can be finalized before comparing the clustering algorithms. The finalization of the prototypes before the comparison of the clustering algorithms can allow the processor 112 to store the finalized prototypes in the memory 114 without having to store every candidate prototype. For example, the processor may generate a chart of the relationship between k and the overall AFL for each clustering algorithm. In an aspect of the disclosure, the chart may be displayed. For example, the, the x-axis for the chart may be k, representing the number of groups created, and the y-axis may be the overall AFL for each k and each clustering algorithm. For k=1, since no categorization is done (e.g., all N images are in the same group), the overall AFL is the largest. Then, for k=N, since each group has only one image, the overall AFL results in zero.

Figure 5B:
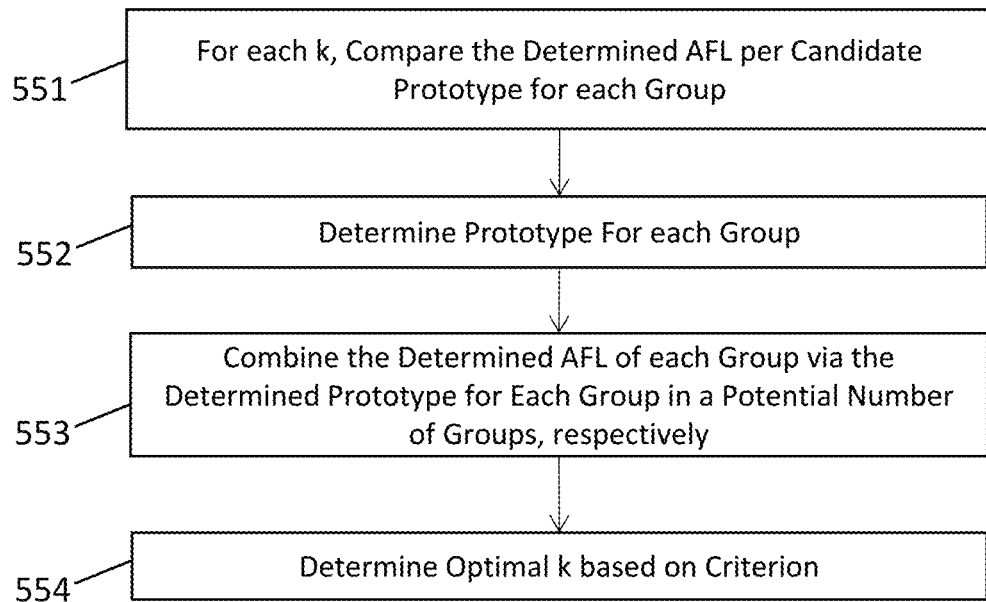
FIG. 5B is a diagram illustrating a process to determine a number of groups in accordance with aspects of the disclosure.

Further, the processor 112 can determine an optimal value for k, or an optimal number of groups to cluster the images. In some examples, when developing sizing systems, it may be challenging to identify an appropriate number of sizes to be made available to consumers. Fewer number of sizes can be relatively more cost-effective and retail sale space friendly, but large number of sizes can accommodate a higher percentage of the population and provide better fit. However, too many sizes can also cause confusion among consumers. FIG. 5B illustrates a process 550 that can be executed by the processor 112 to identify the optimal value of k, or an optimal amount of different sizes. The process 550 can begin at block 551, where the processor 112 can, for each value of k, determine within-group AFL for each group and for each candidate prototype image. The processor 112 can, for each group, compare the within-group AFL values for each candidate prototype image. The process 550 can proceed from block 551 to block 552, where the processor 112 determines a prototype image for each group based on the comparison. The processor 112 can assign the candidate prototype image resulting in the lowest within-group AFL as the prototype image for the group.

The process 550 can proceed from block 552 to block 553, where the processor can combine the within-group AFL values for the assigned prototype image of each group to generate an overall AFL (for each k). For example, for the value k=2, if the AFL for group 1 is A (with respect to the prototype) and the AFL for group 2 is B (with respect to the prototype), then the overall AFL for k=2 is A+B. This is repeated for each k from 1 to N. The process 550 can proceed from block 553 to block 554, where the processor 112 can identify an optimal value of k from the resulting overall AFL values of all values of k with a respective set of prototype images. For example, the criterion can be, for example, based on a rate of change of the overall AFL as the value of k changes such as the derivative or the second derivative. In other aspects, a person viewing the chart described above may identify an optimal k.

Figure 6A:
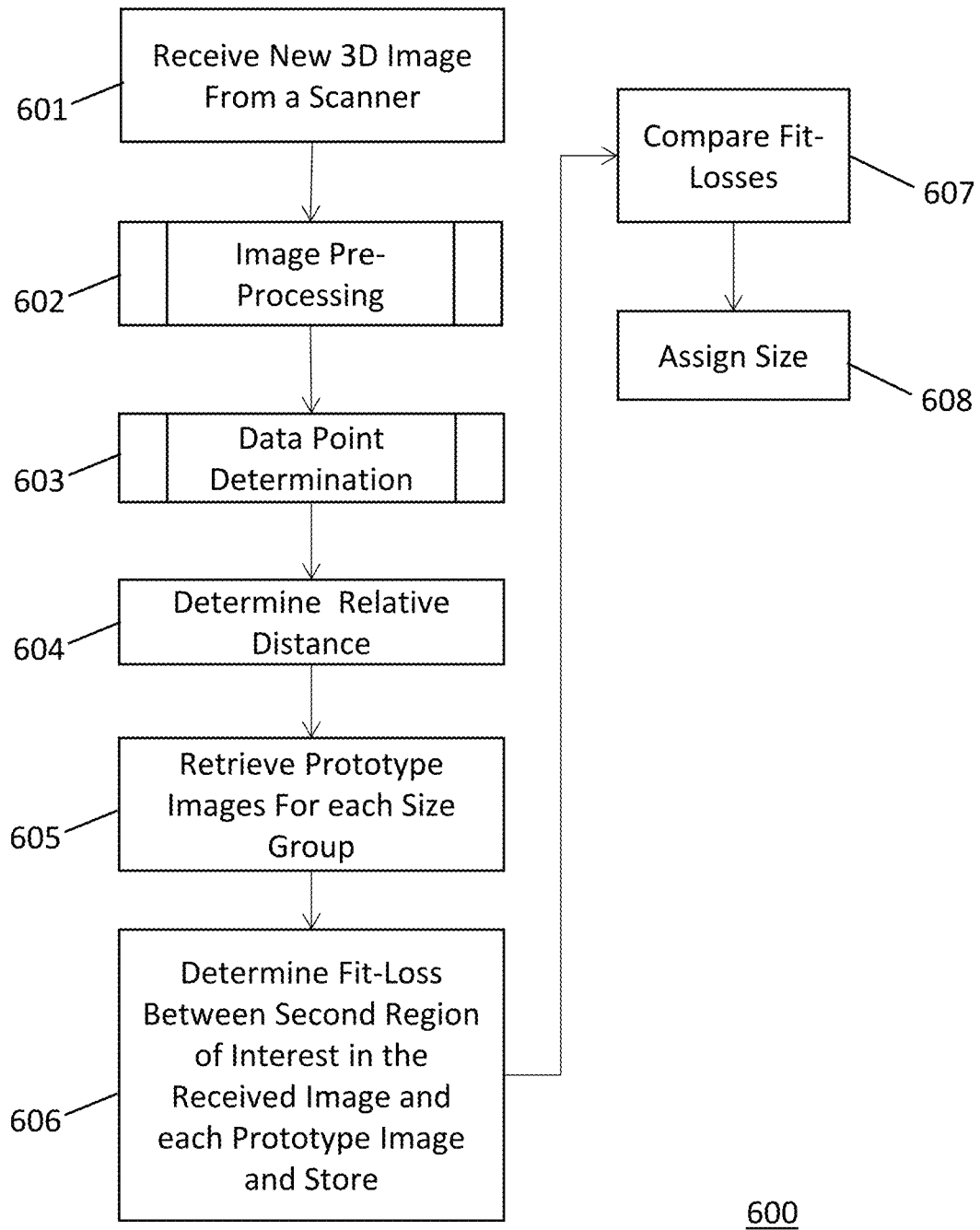
FIG. 6A is a diagram illustrating a process to assign a new image to a sizing scheme in accordance with aspects of the disclosure.

FIG. 6A is a diagram illustrating a process 600 to assign a new image to a sizing scheme in accordance with aspects of the disclosure. The process 600 can begin at block 601, where the processor 112 can receive a new 3D image from a scanner. The 3D image can be a 3D image of the same body part that is not among the plurality of images 103 previously received by the processor 112. The process 600 can proceed from block 601 to block 602, where the processor 112 can perform image pre-processing steps on the new 3D image. For example, the processor 112 can pre-process the new 3D image according to the descriptions of FIGS. 1C-2D above. The process 600 can proceed from block 602 to block 603, where the processor 112 can identify a number of data points (e.g., P data points) in the second region of interest of the new 3D image. For example, the processor 112 can identify the data points in the new 3D image according to the descriptions of FIGS. 3A-3C above, such that the processor 112 identifies the data points of the new 3D image in the same sequence described above (e.g., from i=1 to i=P). The data points may be stored in memory 114.

The process 600 can proceed from block 603 to block 604, where the processor 112 can determine distances between the identified data points in the new 3D image and the 3D reference point of the new 3D image (e.g., using Eq. 1). The process 600 can continue from block 604 to block 605, where the processor 112 can retrieve or extract prototype images for each size or shape group among sizing scheme from a memory (the prototypes were determined in a manner as described above). For example, if there are k size or shape groups, then the processor 112 can retrieve k prototype images from the memory. The process 600 can proceed from block 605 to block 606, where the processor 112 can determine fit-loss values between the new 3D image and each one of the retrieved prototype images in pairs. For example, the processor 112 can use Eq. 2 on the data points identified in the second region of interest of the new 3D image and the data points at the same index i in each one of the retrieved prototype images to determine the fit-loss values of the new 3D image relative to the prototype images. The fit-loss values for each comparison may be stored in memory 114.

The process 600 can proceed from block 606 to block 607, where the processor 112 can compare the fit-loss values determined at block 606. Based on the comparison, the processor 112 can, for example, identify the lowest fit-loss value among the fit-loss values determined at block 606. The lowest fit-loss value can indicate that the new 3D image is most similar to the prototype image that result in the lowest fit-loss value in block 606. The process 600 can proceed from block 607 to block 608, where the processor 112 can identify the size or shape group represented by the prototype image having the lowest fit-loss with respect to the new 3D image in block 606. The processor 112 can assign the new 3D image to the identified size or shape group. In an example, the new 3D image can be a 3D image of an individual and the new 3D image can include a body part, such as breasts. The processor 112 can execute the process 600 to identify an appropriate size for a bra for the individual, and can transmit a recommendation indicating the identified size to a user device of the individual. The recommendation may be displayed on the user device. The user device may be the same device that transmitting the new 3D image. In some aspects of the disclosure, a user may login to the device to obtain the recommendations. In other aspects of the disclosure, instead of transmitting the recommendation to the user device (or in addition), the device may transmit the recommendation to a store or designer of the garment.

In response to the new 3D image being assigned to the identified size or shape group, a determination may be made to determine whether the prototype may be updated. This may be done such that the group continuously be updated to maintain the optimal prototype image. This may be done for each new 3D image that is assigned to a size or shape group. In other aspects of the disclosure, the processor 112 may periodically determine whether the prototype may be updated. For example, the period may be weekly, monthly, bi-weekly, quarterly, etc. In other aspects of the disclosure, the determination may be done after a preset number of 3D image are assigned to the size or shape group. For example, the preset number may be 5, 10, 15, etc. images.

Figure 6B:
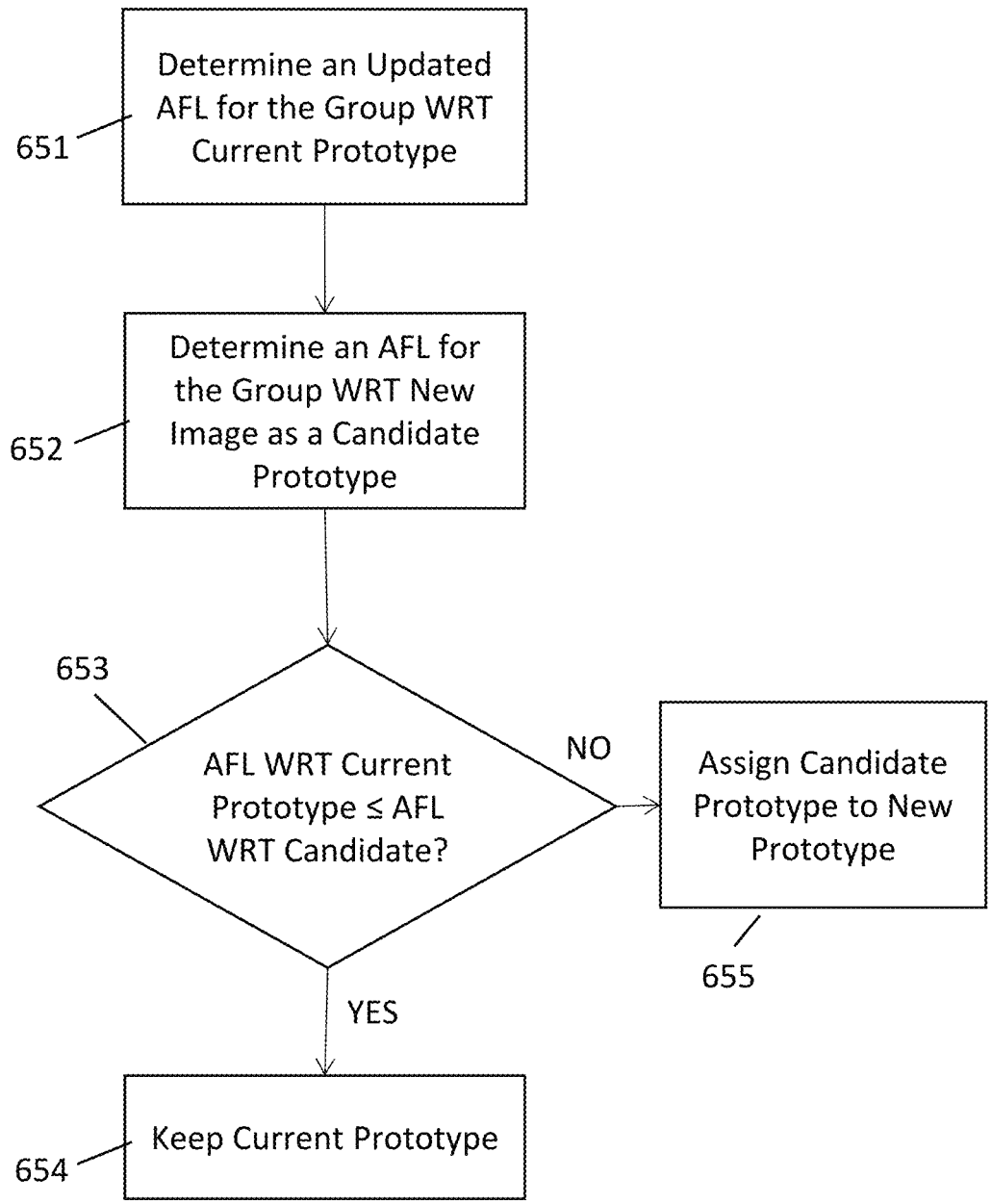
FIG. 6B depicts the process for determining whether to update the prototype in accordance with aspects of the disclosure.

FIG. 6B depicts the process 650 for determining whether to update the prototype in accordance with aspects of the disclosure. The processor 112 updates the AFL for the group to account to the new member(s) of the group. For example, at block 651, the processor retrieves the current AFL determined for the size or shape group for the current prototype from memory 114. The processor adds the fit-loss value determined for the pair(s) of the 3D images, e.g., new received 3D image(s) and the current prototype to the retrieved current AFL. This is the new AFL for the group with respect to (WRT) the current prototype. This may be stored in the memory 114. The process may moves to block 652, where the processor 112 determines AFL(s) for the size or shape group where each new received image(s) is a candidate. This determination is repeated for each new received image. For example, for each image, the image is set as a candidate and the all fit-loss values where the candidate is a member of the pair is added. The determination of the AFL is described above.

The process may moves from block 652 to 653, where the processor 112 compares the AFL determined in block 651 with the AFL(s) determined in block 652. When the AFL WRT the current prototype is less than or equal to the AFL WRT the candidate prototype(s) (each one), then the processor 112 determines that the current prototype should be kept (YES at 653). This means that the current prototype is more representative of the size or shape group than any of the new received images. On the other hand, when the AFL for a new received image(s) (candidate prototype(s), the processor determines that one of the new image(s) should be the new prototype for the size or shape group (NO at 653). The process may moves to block 655. If only new image, e.g., candidate prototype satisfies, the determination (NO at block 653, this image is assigned as the prototype for the size or shape group for subsequent use. For example, a flag may be associated with this image. In other aspects of the disclosure another type of indication may be stored in the memory 114 to identify the prototype image. However, when there are more than one image, e.g., candidate prototype images having a lower AFL, the processor first determines which candidate image has the lowest AFL and assigns the corresponding image as the new prototype image for the group. The above process is referred later in the examples as the complete AFL method.

In other aspects of the disclosure, the sizing scheme may be determined without the clustering techniques as described above. For example, in accordance with this aspect, one or more features of the image may be measured. For example, where the target body image may be the breast, the underbust circumference may be measured in a first region of interest. This measurement may be prior to the shifting described above. The 3D images may be initially grouped into size or shape group based on this measurement. In other aspects, the measurement may be based on a difference between a measurement of the circumference of the bust and the underbust (DeltaB). The measurements may not be limited to these features. For example, where the sizing is for a shirt, the measurement may be the waist circumference or length of an upper torso. In an aspect of the disclosure, the grouping may be based on a preset definitions of the size or shape group. The preset definition may be received from a garment manufacturer or a store. In other aspects, of the disclosure, the size or shape groups may be defined to be evenly spaced within a preset minimum size parameter and a preset maximum size parameter. The minimum and maximum size parameters may be received from a manufacturer or a store. The interval, e.g., spacing between is size or shape group may be based on the number of groups. Less groups would have a higher spacing between size or shape groups. The number of groups may be based on information received from a manufacturer or store.

Once the images are categorized into groups based on one or more measurements, a prototype within each group is determined in a manner as described above. For example, each image within the group may be pre-processed as described above, data points identified, and fit-loss values determined between all possible pairs of images within the group, After the fit loss values for each combination of pairs of the images WRT the region of interest, the processor 112, AFLs are determined for the size or shape group where each image is an candidate image in the manner described above. The prototype image may be selected where it has the lowest AFL among all of the candidate prototype images. This selection process may be executed for each size or shape group. This process is referred to herein as a partial AFL method.

Figure 7A:
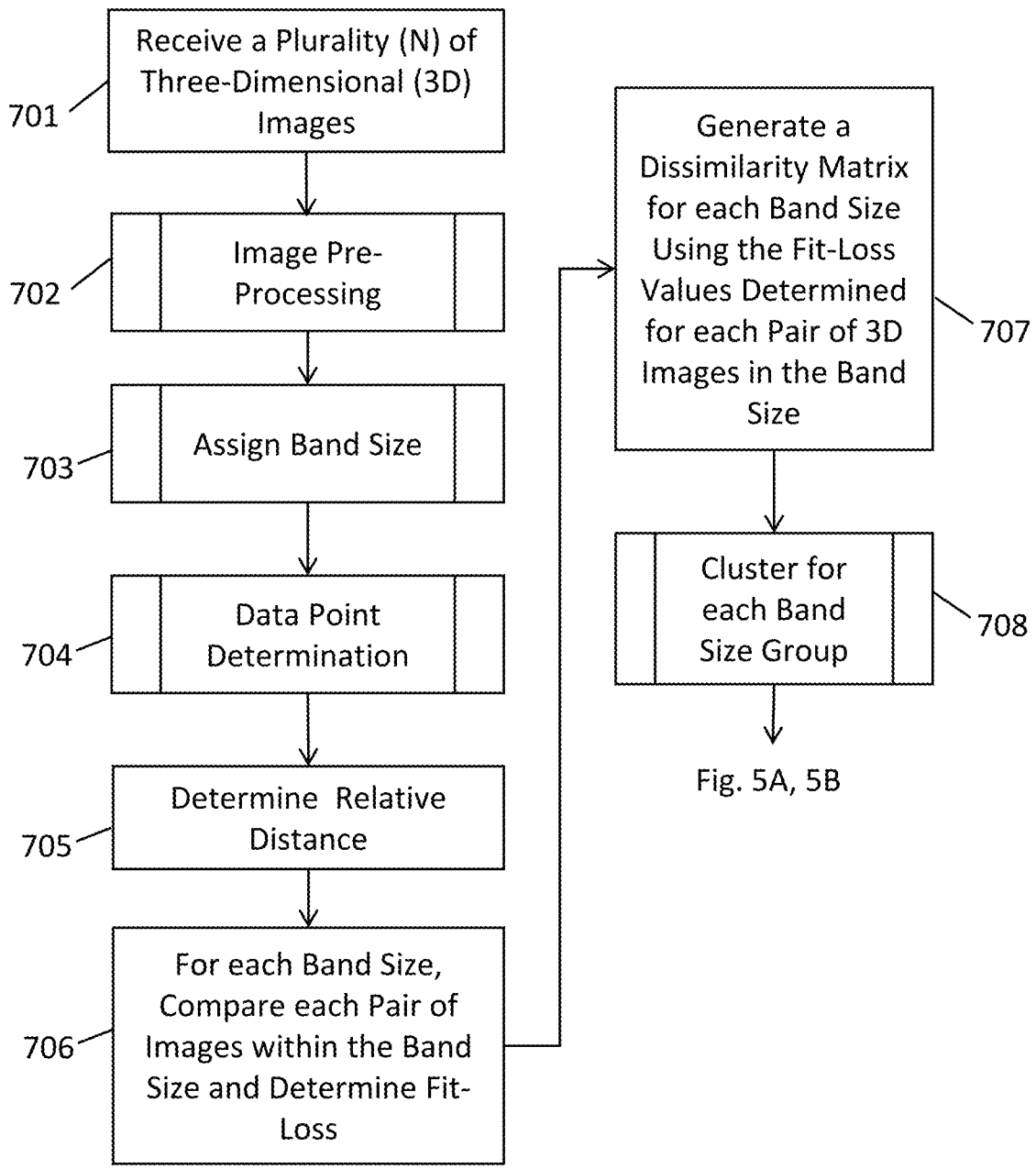
FIG. 7A is a diagram illustrating a process to develop a sizing system with a constraint in accordance with aspects of the disclosure.

FIG. 7A is a diagram illustrating a process 700 to develop a sizing system with a constraint in accordance with aspects of the disclosure. The process is referred to in the example as the hybrid AFL method. In an example, the processor 112 can be configured to develop a sizing system subject to a size constraint. The size constraint may be based on the target body part or garment. For example, the processor 112 can develop a bra sizing system with a fixed set of band size and one or more subgroups under each band size to represent different shape of the breasts under each band size. The band size may be predefined by a manufacturer or store. The process 700 can begin at block 701, where the processor 112 can receive a plurality of 3D images, such as N 3D images, from the devices 101. The reception of the images may be similar as described above. The process 700 can proceed from block 701 to block 702, where the processor 112 can perform image pre-processing steps on the received 3D images. For example, the processor 112 can pre-process each 3D image among the N 3D images according to the descriptions of FIGS. 1C-2D above. In other aspects of the disclosure, the band size may be measured directly from the 3D image without all of the features of the above described pre-processing. For example, the measurement of the band size may occur prior to the identification of the second region of interest. Additionally, the measurement of the band size may be before the shifting.

The process 700 can proceed from block 702 to block 703, where the processor 112 can assign a band size to each 3D image among the N 3D images. In an example, to be described in more detail below, the processor 112 can determine an optimal amount of total number of subgroups, or the total number of size groups m, where each one of the m size groups can be categorized with a band size and a shape group. For example, if there are j band size and within each band size there are x shape groups, then k=jx total size groups. In another example, if the j band size groups have different shape groups, then $k=x_1+x_2+\ldots$. The processor 112 can distribute the N 3D images among the j band size groups, then proceed to block 704 to perform data point determination on each 3D image among the N 3D images. For example, the processor 112 can identify the data points for each 3D image among the N 3D images according to the descriptions of FIGS. 3A-3C above. The processor 112 can identify the data points of each 3D image among the N 3D images using the same sequence described above (e.g., from i=1 to i=P).

Figure 7B:
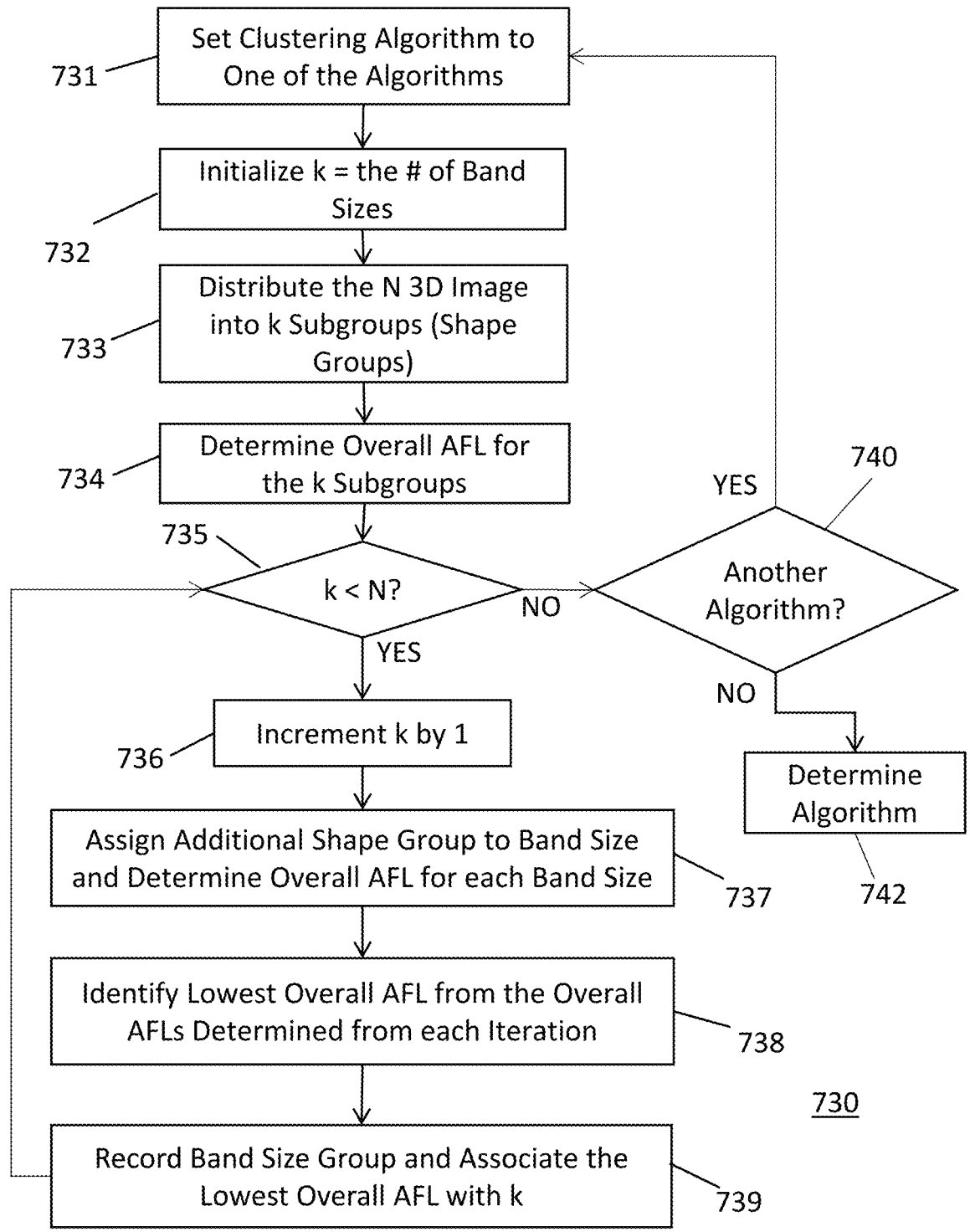
FIG. 7B is a diagram illustrating a process to determine the optimal clustering algorithm in accordance with aspects of the disclosure.

The process 700 can proceed from block 704 to block 705, where the processor can determine distances between each identified data points in block 704 and the 3D reference point. The process 700 can proceed from block 705 to block 706, where for each band size group, the processor 112 can compare the determined distances of every possible pair of 3D images in the band size group to determine fit-loss values for pairs of 3D images that are assigned to the band size group. For example, an image A assigned to band size group j=1 can be compared with every other 3D image assigned to band size group j=1, but will not be compared with 3D images that are assigned to the band size group j=2. The processor 112 can, for each band size group, determine fit-loss values for every possible pair of 3D images that are assigned to the same band size group. The process 700 can proceed from block 706 to block 707, where the processor 112 can generate a dissimilarity matrix for each band size group using the fit-loss values determined at block 706. The dissimilarity matrix for each band size group can indicate discrepancies between every possible pair of images among the images in the band size group. The 700 can proceed from block 707 to block 708, where for each band size group, the processor 112 can cluster the images in the band size group into subgroups based on the band size group's dissimilarity matrix. The clustering can be performed by the processor 112 according to the descriptions of FIGS. 5A-5B (including the determining the prototype for each subgroup within the band size group), however, an optimal clustering algorithm may be determined for all the band size groups such that the same clustering algorithm may be used for each group. A method of determining the optical clustering algorithm is shown in FIG. 7B. In other aspects of the disclosure, the optimal clustering algorithm may be determined per band size group repeating the above described determination for each group. In this aspect, a different optimal clustering algorithm may be used for different band size group.

Based on the clustering at block 708, the processor 112 can define a sizing system subject to constraint, such as a bra sizing system with traditional band sizes. The bra sizing system based on identification of surface points on a 3D image, subject to the constraint of maintaining usage of traditional band size, can allow manufacturers to utilize the sizing system described herein without drastic modifications to existing techniques.

In other aspects, the neck circumference or arm length may replace the band size groups where the garment is a shirt.

In some aspects of the disclosure, the number of shape sizes within a band size may be determined in the manner as described above such as described in FIG. 5B. The determination would be make may be made for each band size. After determining the number of shape sizes within band size group, in some aspects, the processor may determine the total number of shape sizes among all of the band sizes. If the total number is large, this number may be reduced. In an aspect of the disclosure, the reduction may be to a preset maximum number. This is because in practice a manufacturer or store may not want too many size groups. In other aspects of the disclosure, the processor instead may look at the number of groups within each band size. The preset maximum number may be received from the manufacturer or store.

FIG. 7B is a diagram illustrating a process to determine the optimal clustering algorithm in accordance with aspects of the disclosure. The process 730 begins at block 731 where one of the one or more clustering algorithms is set for processing. Blocks 732 through block 740 are performed for all of the one or more clustering algorithms. At block 732, the processor 112 initializes a value k, which is a number of total size groups within all of the band size groups. The initial value of k is the number of band sizes (band size group). This is because for the initial determination each band size group is assigned one shape group. At block 733, the processor 112 clusters the 3D images into the k subgroup, e.g., one shape group in each band size. At block 734, the processor 734 may determine an overall AFL value for distribution of the N 3D images into the k total number of subgroups. The overcall AFL is determined by adding the AFL of the group in a band size with all other AFLs from the other band sizes. For example, if there are five band size groups, and the AFL for band size group 1 is A, the AFL for band size group 2 is B, the AFL for band size group 3 is C, the AFL for band size group 4 is D and the AFL for band size group 5 is E, than the overall AFL is A+B+C+D+E. The overall AFL can be stored (e.g., in memory 114).

At block 735, the processor 112 may determine whether k reach N, where N is the number of 3D images. When k is N, each 3D image is its own subgroup (shape group). If the processor 112 determines that k is less than N (YES) at block 735, the processor 112 increments the value of k by 1 at block 736. At block 736, the processor 112 can randomly select one of the values associated with a band size group to increment by 1, such as setting j=j+1, where j is the number of subgroups (shape groups) for a band size (one band size to start with). In other aspects, the processor 112, may select one of the values to increment by 1 based on various selection scheme (e.g., round robin). In an example, the processor 112 can iteratively increment one value such as by first incrementing $j_1$, where $j_1$ is the number of subgroups (shape groups) in band size 1 to j+1 and then revert the increment back to j and increment $j_2$, to j+1 from j, etc. For example, for the second pass and where the number for band size groups is 5, one of the band size groups will have two shape groups while the others only have one. For this grouping, the overall AFL is determined in a similar manner as described above. The AFL for one of the band size groups will be determined by summing the AFL for two shape groups (when k is 6). The process is repeated until each band size group has the additional shape group (with the others not having the same). Therefore, when there are five band groups, the process may be repeated five time, resulting in five overall AFLs. This is also assumes that the number of images in the band size group is more than the assigned shape groups in block 736. When the number of images in the band size groups equals the number of assigned shape groups (and each 3D image is its own shape group), no other (subgroups) shape groups may be assigned to the band size group.

The process 730 can proceed from block 737 to 738, where the processor 112 may identify the lowest overall AFL from among the overall AFL values for k (one for each band size). The lowest overall AFL indicates the larger decrease in overall AFL from the overall AFL determined for k−1, one less subgroup (shape group).

The process 730 can proceed from block 738 to 739, where the processor 112 stores the band size group associated with the determined lowest overall AFL in the memory 114. The processor 112 may also associate the lowest AFL value identified in block 738 with the current value of k and store the lowest overall AFL in the memory 114 in association with the current k, This information may be stored in a table. The lowest overall AFL and k may be used to determine the optical algorithm.

The assigned number of shape groups in each band size group may not revert back, e.g., the additional shape group is kept in the band size that had the lowest overall AFL for the current k. The process 730 can return to block 735 to identify a lowest AFL for each value of k, until the N is reached (NO at block 735). Block 736 through block 739 are repeated. The number of iterations at each k, e.g., assignments to a different band size may be reduces as the number of k increase, because k may be greater than the number of 3D images assigned to the band size.

Once k equal N (the total number of 3D images) for a clustering algorithm, the processor 112 determines whether there is another clustering algorithm which has not be processed at block 740. When there is another clustering algorithm that has not been processed, the process 730 returns to block 731 and another clustering algorithm is set. When all of the clustering algorithms have been processed, the process 730 moves to block 742. At block 742, the processor determines which of the one or more algorithms is the optimal algorithm. In an aspect of the disclosure, the processor 112 may identify an optimal value for clustering algorithm based on a relationship between the lowest overall AFL associated to ks for each clustering algorithm, The processor 112, may generate one or more curves on a graph showing the relationship between the lowest overall AFL and k, where k may be on the x-axis and the lowest overall AFL on the y-axis. The processor 112, using this chart, may automatically determine the optimal clustering algorithm. In other aspects, a person looking at the chart may determine the optimal clustering algorithm based on a criterion. For example, the criterion may be the lowest overall AFL from among all of the clustering algorithms over the most values of k, where k values from a minimum, e.g., the number of band groups to N, the total number of 3D images.

Figure 7C:
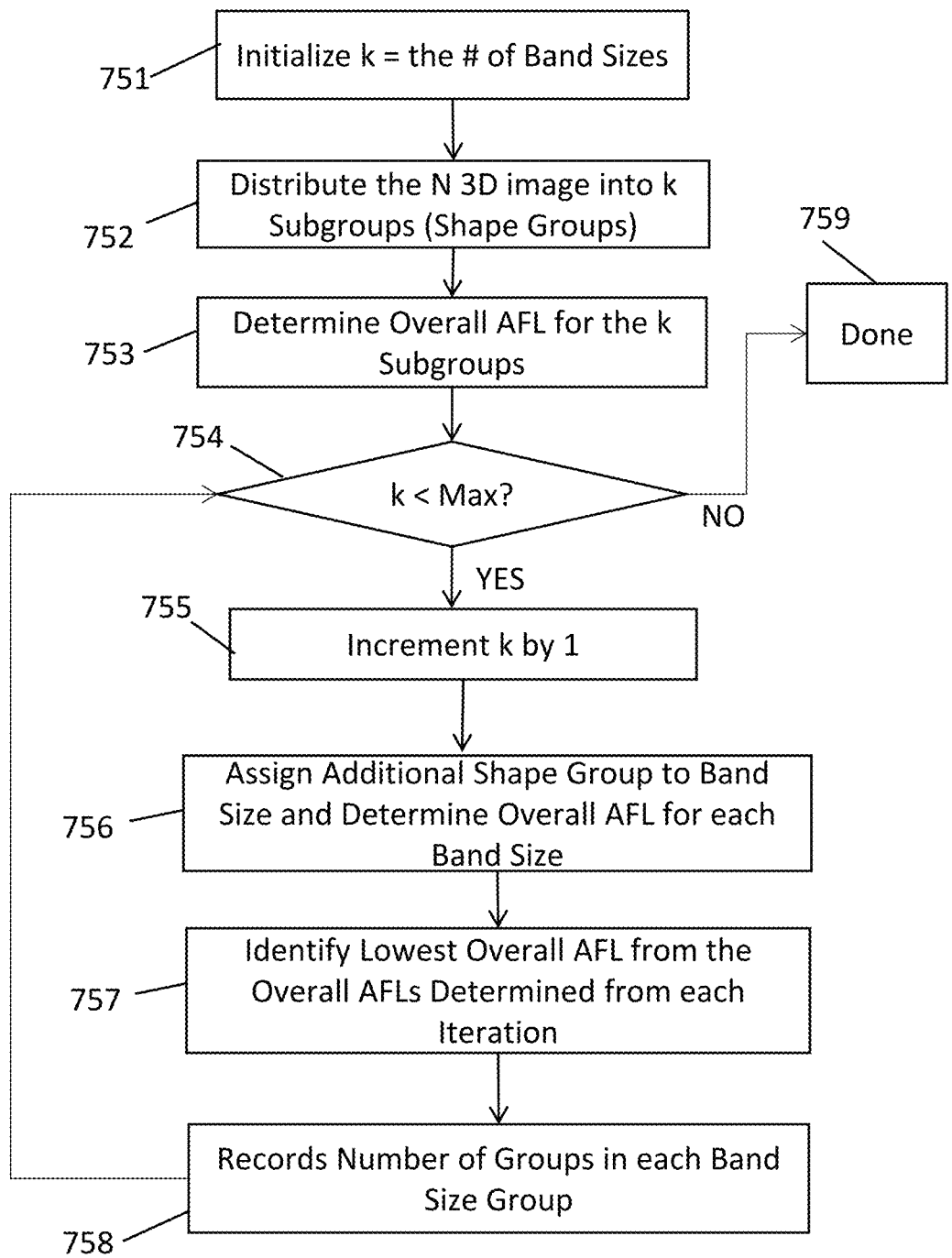
FIG. 7C is a diagram illustrating a process to determine an optimal distribution of subgroups (shape groups) within the different band size group in accordance with aspects of the disclosure.

FIG. 7C is a diagram illustrating a process to determine an optimal distribution of subgroups (shape groups) within the different band size group when the total number of subgroups is greater than the preset maximum value, in accordance with aspects of the disclosure. Many of the blocks for determine the optical distribution of subgroups (shape groups) are similar to the blocks use to determine the optimal clustering algorithm. For example, blocks 751 to 753 are similar to blocks 732 to 734. At block 752, the processor 112 may also store the number of subgroups (shape groups) in each band size group in memory 114. In this case, each band size group has one subgroup (shape groups). These values may be incremented as set forth below. At block 754, instead of determining whether k (current value) is less than N, the processor 112 may determine whether the current value of k is than the preset maximum value. Blocks 755 to 757 are similar to blocks 736 to 738. After block 757, the process 750 moves to block 758. At block 758, the processor 112 records the number of subgroups in each of the band size groups that resulted in the determination in block 757 in memory 112. For example, where there are five band size groups and the additional subgroups (shape groups) in group 1 was determined to satisfy block 757, the processor with add 1 to the subgroups associated with the band size group and store the same in memory 114. The number of subgroups (shape groups) remains the same for the others. Blocks 755 to 758 are repeated each time it is determined that K is less than the preset maximum value. Each repetition, the processor 112 records the increase in the number of subgroup for one band size group (at block 758) as long as the number of 3D images in the band size group are greater than the number of subgroups in the band size group (when equal, each 3D image is its own subgroup (shape group). When the processor 112 at block 754 determines that the current k equals the maximum, the distribution of subgroups (shape groups) is done at block 759 and the values recorded at block 758 (incremented) represent the distribution of the subgroups (shape groups) among the band size groups.

Figure 7D:
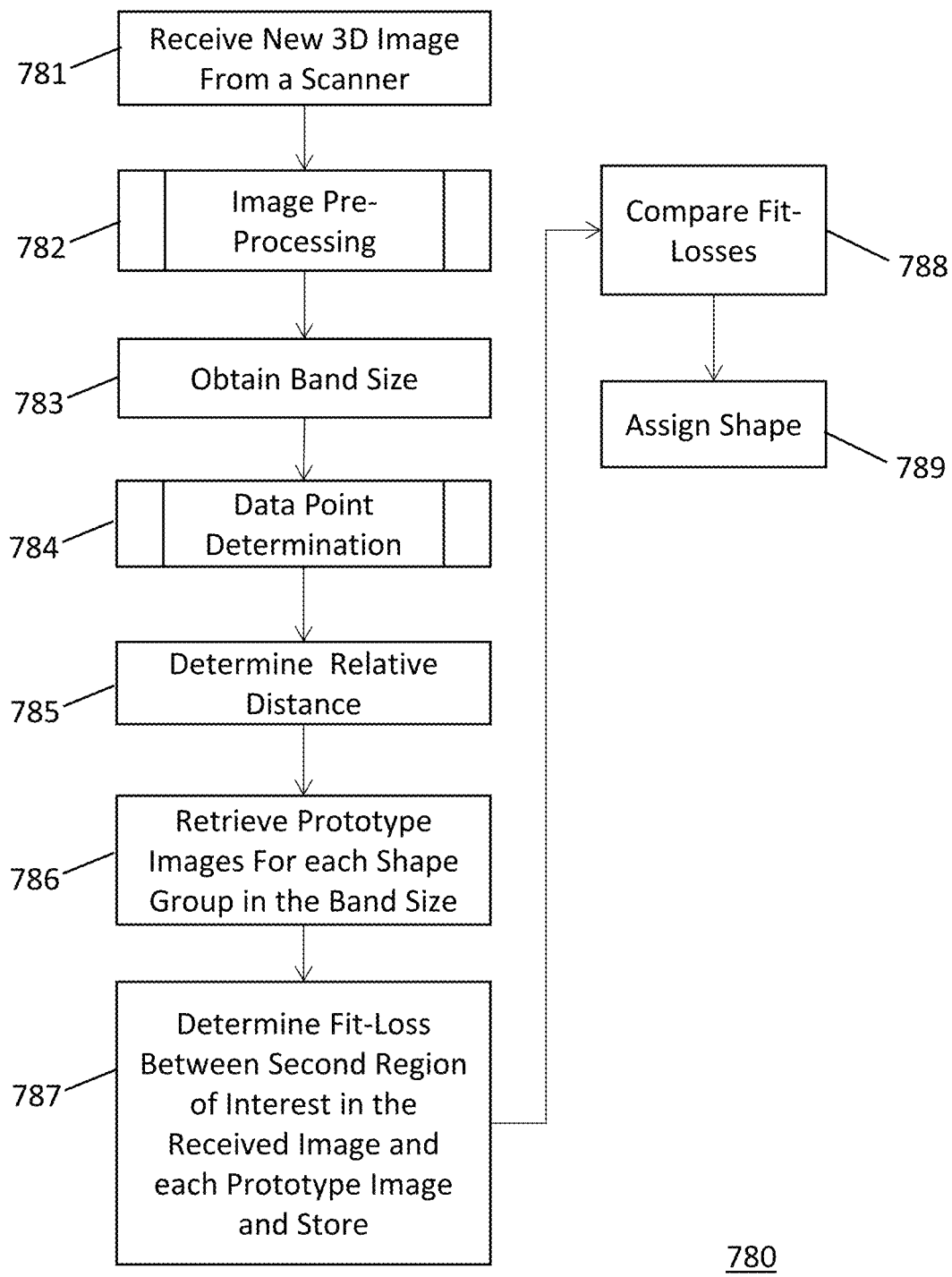
FIG. 7D is a diagram illustrating a process to assign a new image to a sizing scheme in accordance with aspects of the disclosure.

FIG. 7D is a diagram illustrating a process 780 to assign a new image to a sizing in accordance with aspects of the disclosure. The process 780 can begin at block 781, where the processor 112 can receive a new 3D image from a scanner. The 3D image can be a 3D image of the same body part that is not among the plurality of images 103 previously received by the processor 112. The process 780 can proceed from block 781 to block 782, where the processor 112 can perform image pre-processing steps on the new 3D image. For example, the processor 112 can pre-process the new 3D image according to the descriptions of FIGS. 1C-2D above. The process 780 can proceed from block 782 to block 783, where the processor 112 obtain a band size of a body part (e.g., breasts) shown in the new 3D image. In some examples, the processor 112 can determine the band size by analyzing a first region of interest identified from the new 3D image in block 782. In some aspects, the processor can determine the band size from the received 3D prior to identifying the first region of interest. In some examples, the processor 112 can obtain the band size from user input (e.g., from the user that possesses the body part in the new 3D image). The new image is assigned to the band size corresponding to the measured or received value. The processor 112 assigns the 3D image to the band size where the band size is closest to the measured or received value. In an aspect of the disclosure, when the measured or receive value is equidistance to multiple band sizes, the processor 112 may assign the 3D image to multiple band sizes.

The process 780 can proceed from block 783 to block 784, where the processor 112 can identify a number of data points (e.g., P data points) in the second region of interest of the new 3D image. For example, the processor 112 can identify the data points in the new 3D image according to the descriptions of FIGS. 3A-3C above, such that the processor 112 identifies the data points of the new 3D image in the same sequence described above (e.g., from i=1 to i=P).

The process 780 can proceed from block 784 to block 785, where the processor 112 can determine distances between the identified data points in the new 3D image and the 3D reference point of the new 3D image (e.g., using Eq. 1). The process 780 can continue from block 785 to block 786, where the processor 112 can retrieve or extract prototype images for each size group under the obtained band size from a memory, e.g., 114. For example, if there are j band size groups, k size groups under each band size group, and the obtained band size is j=2, then the processor 112 can retrieve k prototype images associated with the j=2 band size group from the memory. The process 780 can proceed from block 786 to block 787, where the processor 112 can determine fit-loss values between the new 3D image and each one of the retrieved prototype images in pairs. For example, the processor 112 can use Eq. 2 on the data points identified in the second region of interest of the new 3D image and the data points at the same index i in each one of the retrieved prototype images of the obtained band size group to determine the fit-loss values of the new 3D image relative to the prototype images of the obtained band size group. The determine fit-loss values may be stored in the memory 114.

The process 780 can proceed from block 787 to block 788, where the processor 112 can compare the fit-loss values determined at block 787. Based on the comparison, the processor 112 can, for example, identify the lowest fit-loss value among the fit-loss values determined at block 787. The lowest fit-loss value can indicate that the new 3D image is most similar to the prototype image that result in the lowest fit-loss value in block 787. The process 780 can proceed from block 788 to block 789, where the processor 112 can identify the size group represented by the prototype image having the lowest fit-loss with respect to the new 3D image in block 787. The processor 112 can assign the new 3D image to the identified size group and the obtained band size. In an example, the new 3D image can be a 3D image of an individual and the new 3D image can include a body part, such as breasts. The processor 112 can execute the process 780 to identify a bra having the obtained band size and the identified size group, and can transmit a recommendation indicating the identified size to a user device of the individual. The recommendation may be distributed to the individual and/or manufacturer and/store in a similar manner as described above.

When the new image(s) is assigned to a specific subgroup within the band size, the processor 112 may determine whether the new image(s) should be the prototype for the subgroup in a manner similar to the process 650 described above (for the respective subgroup). This may be performed for each subgroup with new image(s).

Testing

Aspects of the disclosure were tested. A total of 46 female participants were recruited for 3D body scanning. Participants were all Caucasian, non-obese (BMI below 30), 18 to 45 years of age. They were scanned in the standard standing posture with their upper body nude. A Human Solutions VITUS/XXL 3D Body Scanner (Technology: Laser triangulation; Output formats: ASCII, DXF, OBJ, STL; Average girth error <1 mm) was used.

Each image was pre-processed in the manner described above such that certain planes like a bust or underbust were defined. The definitions of these planes were defined as described herein (not according to traditional definitions) to ensure that the hole breasts were included and not truncated. Small holes on the scans were also filled in based on surrounding curvatures beforehand. The scans were processed in Matlab® (Version R2018b), with the limbs, neck, head, and the portion below the underbust plane removed.

The scans were also processed as described above such that each of them has exactly 9,000 points, which were arranged in the exact same order without distorting the scan. Specifically, each scan contains 50 equally-spaced horizontal slices (or transverse planes), arranged by their z-coordinates. Each slice has 180 points. The angle increment is 1 degree, which means that starting from −180° to 0° there is one point at every degree. Further, as described above, if a point is missing, its coordinates are replaced by NaN's (representing undefined values) to hold the space for the point, and more importantly, to maintain the sequence and indexing of other points One breast scan was randomly selected from the 46 scans and was reserved for later demonstration. The rest of the 45 scans were involved in the calculation of the pairwise fit-loss. A 45-by-45 dissimilarity matrix (shown in FIG. 8A) was generated, containing the values calculated from the fit-loss function for all pairs of scans. The matrix is symmetric about its diagonal (i.e. L(d1, d2)=L(d2, d1)), and values on the diagonal are uniformly zero, because the fit loss of a scan to itself is zero (i.e. L(d1, d1)=0).

The larger the fit-loss value is between a pair, the more dissimilar the pair is in shape. For example, the dissimilarity matrix 800 can show that the body part in the image P1 appears to be more similar to the body part shown in P2 than the body part shown in P3 (P1-P2 fit-loss is less than P1-P3 fit-loss).

In an example, the dissimilarity matrix 800 can be clustered into groups. In the example shown in FIG. 8B, the images P1, P2, P3, P4 can be clustered into the same shape group 802. To identify a prototype image, a processor iteratively assigns each image among the group 802 as a candidate prototype image, and determines the within-group AFL for each candidate prototype image. For example, when P1 is assigned as the candidate prototype image, the within-group AFL can be obtained by adding up the values in rows 2, 3, 4 of column 1, such as 184.02+378.31+130.28=692.61. The within-group AFL for P2, P3 and P4 being the candidate prototype are 622.12, 893.17 and 407.52, respectively. A processor can identify 407.52 as the lowest within-group AFL. Then, a processor can identify P4 as the prototype image of the shape group 802.

Figure 9:
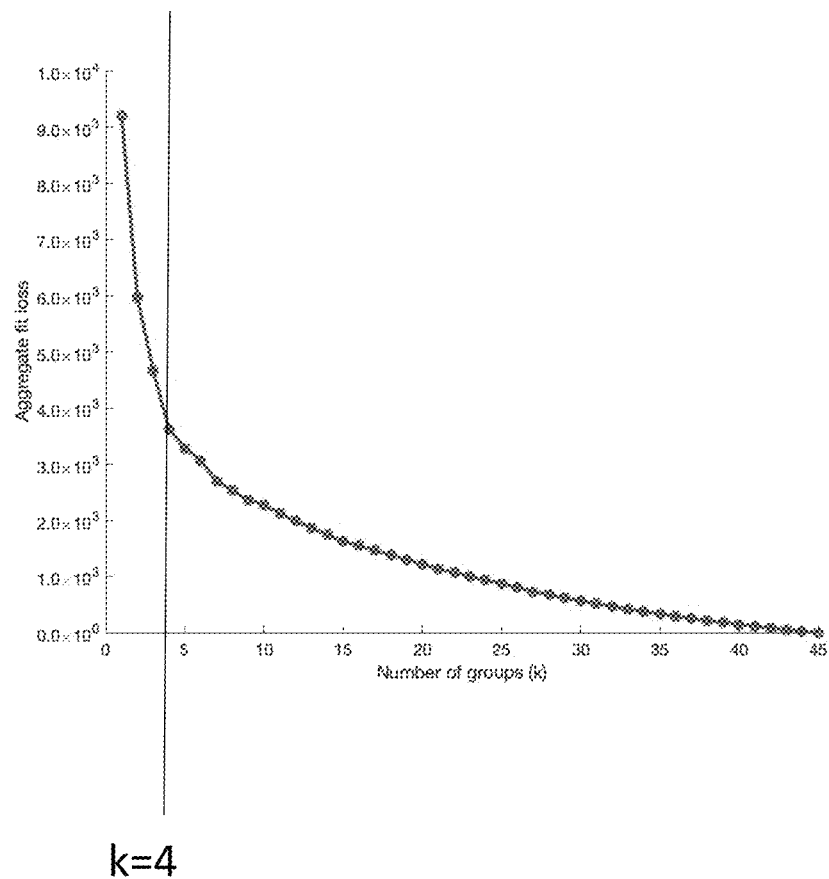
FIG. 9 a diagram illustrating a plurality of overall AFL values that can be used to identify an optimal number of shape groups in accordance with aspects of the disclosure.

FIG. 9 a diagram illustrating a plurality of overall AFL values that can be used to identify an optimal number of shape groups. In an example, the graph shown in FIG. 9 can be an example result of an execution of the process 550 (FIG. 5B) for N=45 (45 3D images). The horizontal axis of the graph represents the number of groups k, and the vertical axis of the graph represents an overall AFL for each value of k. In the graph, the overall AFL curve drops relatively more dramatically at the beginning (e.g., from k=1 to k=4), such that the slope of the curve appears to be much steeper when k=4. Further, the curve appears to drop less and less significantly after k=4. Therefore, increasing the number of groups or value of k appears to be more efficient when the value of k is relatively small. In an example, at k=4, the accumulative reduction in the overall AFL appears to reach approximately 60% of the initial AFL value (when k=1). Also, when k≥13, the accumulative reduction appear to reach approximately 80% of the initial value, and when k≥24, the accumulative reduction appear to reach approximately 90%. Therefore, k=4 may be selected to be the optimal value, and a processor may cluster the images into 4 groups as a result of choosing k=4 as the optimal number of groups. Then, a sizing system for the images can be developed where the sizing system include 4 different size groups.

Figure 10:
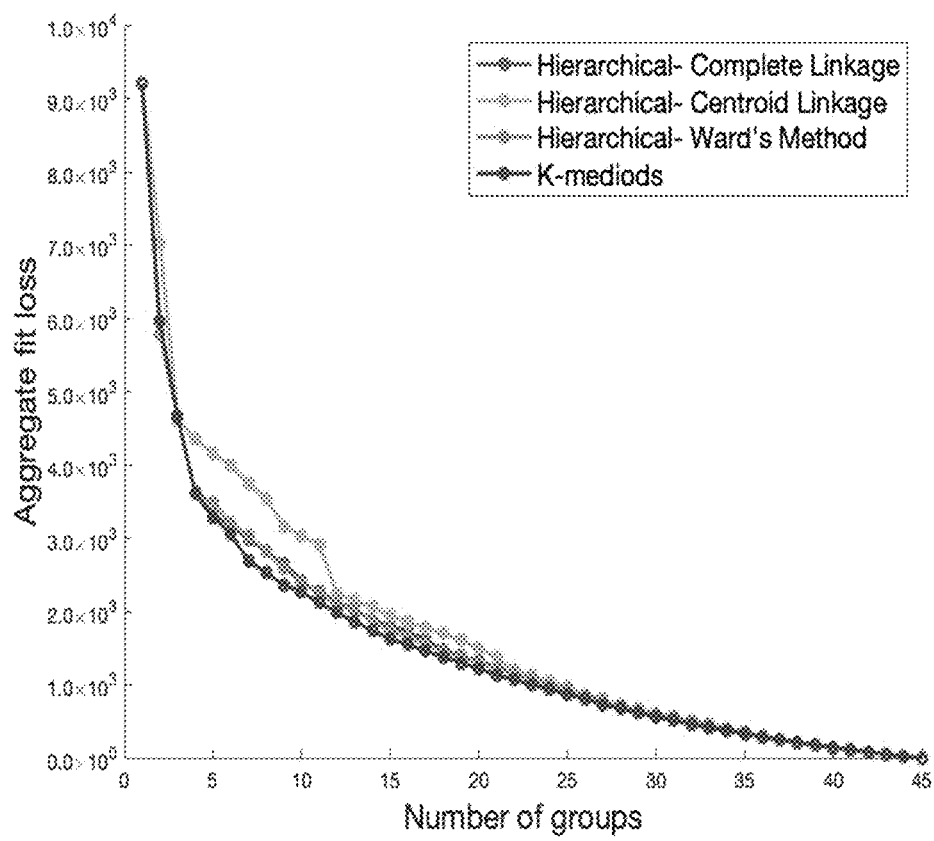
FIG. 10 is a diagram illustrating a plurality of overall AFL values by applying multiple clustering algorithms in accordance with aspects of the disclosure.

FIG. 10 is a diagram illustrating a plurality of overall AFL values by applying multiple clustering algorithms. In an example, the graph shown in FIG. 10 can be an example result of applying multiple clustering algorithms on 45 3D images, for all values of k. In the graph shown in FIG. 10, the horizontal axis is the number of groups (k) created, and the vertical axis is the overall AFL for each k. The number of groups (k) ranges from 1 to 45, where k=1 is the case when no categorization is done, and it is when the overall AFL is the largest; and k=45 is the case when each subject has its own group. It is also the case when the overall AFL equals zero.

The overall AFL can be reduced by categorizing the breasts into appropriate groups. The within-group AFL can be minimized by selecting the right prototype breast shape. To find the optimal prototype breast shape for a given group, every image in the plurality of images in the group can be assigned as the prototype shape and the corresponding AFL can be computed, the results are compared and the lowest value is can be identified. To categorize breast shapes, a few clustering algorithms which directly use the dissimilarity matrix as their grouping standard are tested. However, not all clustering algorithms are applicable. For instance, K-means clustering requires the raw values of the variables. In the testing, K-medoid clustering and Hierarchical clustering were considered. There can be many different methods to conduct Hierarchical clustering, such as Ward's method, Complete-linkage clustering, and Centroid-linkage clustering. Three Hierarchical clustering methods and the K-medoid clustering method were compared in the graph shown in FIG. 10. The algorithm that ends up with the lowest AFL may be selected to perform the clustering. In the graph shown in FIG. 10, among the four clustering methods, K-medoids clustering results in the lowest overall AFL for the majority of k's. Therefore, K-medoids clustering can be selected to perform the clustering disclosed herein (e.g., FIG. 5A), also referred to as the complete AFL method.

FIG. 11 is a diagram illustrating a table that may be used to assign a body part to a shape group. The table in FIG. 11 is based on a clustering result of 45 3D images, where the clustering results may be considered as the basis of a sizing system. A new 3D image (e.g., the 46th image) may be received by the system, and the new 3D image may need to be assigned to a size shape in the sizing system. Further, the new 3D image may be incorporated to update the sizing system. In some examples, there are software available to turn a series of 2D photos taken for the same object from different perspectives into a 3D model. Therefore, consumers may upload their 3D scans to online stores or step into a 3D scanner in a physical store to get scanned is not implausible. The fit models or dress forms, e.g., the prototype breasts obtained through the clustering and optimization, is the basis for product development. Typically an apparel company would develop their product to fit those fit models perfectly. Maintaining the prototypes can ensure the consistency in the products in terms of fit. The assignment of the new 3D image into a size or shape group may include calculating the fit-loss between the new case or the new 3D image and each of the prototypes; and designate the new case to the group of which the prototype has the lowest fit-loss value associated as described above.

Because the prototypes remain the same, all the other cases are impact free, thus the increase in the overall AFL is the same as the fit-loss between the new case and the prototype of a group. The table of FIG. 11 shows the fit-loss of the reserved case (46th case) from each of the prototypes, among which the fit-loss from Subject c is the lowest. Therefore, the new case should be designated to Group 3. The increase in the overall AFL by including this new case can be as low as 104.7 (difference in fit-loss between the new case and the prototype). This confirms that the designated of the reverse case to Group 3 was a good choice. Subject a of Group 1 (which is the prototype for Group 1) has the second to lowest fit-loss value (130.3).

Nonetheless, if a considerable number of new cases have been added into the database, it may be preferable to change the prototypes. The reserved case was also used to demonstrate how to allocate a new case while allowing for the new case itself to be the new prototype of a group. The new case may or may not be suitable as the new prototype, depending on the amount of the within-group AFL that it brings in. This method is still a direct application of the clustering results, because the original structure of the categorization remains the same. Again, the other groups remain impact free, thus the change in the within-group AFL of one group, to which the new case got assigned, is the same as the change in the overall AFL.

The increase in the overall AFL was calculated when the new case was assigned to a group and, at the same time, was made the prototype of that group temporarily. As shown in the figure, for most of the cases, the increase in the AFL is very large, much larger than the result when the new case was not made to be the prototype. Therefore, for this particular subject, it is more appropriate to just make it an ordinary group member. However, for another subject, it is possible that making it the prototype of a certain group will result in a smaller increase in the AFL. In addition, the two values associated with Subject d of Group 4 in FIG. 10 are exactly the same (1578.0). It is because originally Group 4 only contained one subject (i.e. Subject d). Whether the new case becomes the prototype or not, the increase in the AFL is always the fit-loss value between the two. This also shows that the original clustering was not restricted by the number of subjects included in each group (one subject can still become a group). However, the group with only one or very few number of subjects can be removed to further reduce the total number of groups, sacrificing the accommodation rate of the population.

Furthermore, the calculations can be simplified. The fit-loss values between the new case and each of the prototypes are still required, to target the lowest fit-loss value and the corresponding group. Then it is not necessary to let the new case replace the prototype of any groups other than the targeted group.

Furthermore, in the rare case scenario where the breast shape of a new subject has the same amount of fit-loss with more than one prototypes, then the scan of the subject may be classified into any of the corresponding groups, and the subject herself mat try on all of the corresponding sizes and make judgment based on her subjective preference.

The test also categorized the 45 scans using traditional measurements. This forms a basis of comparison to the Complete AFL Method (and other of the disclosed methods). The bust and underbust circumferences on the bust and underbust planes of the scan were respectively measured. The difference between the bust and underbust circumferences, which is generally used to determine cup sizes, is referred to as DeltaB herein. Evenly spaced intervals were created for the full range of underbust circumference within the data, and the number of intervals is also k ($1 \leq k \leq 45$).

Figure 12:
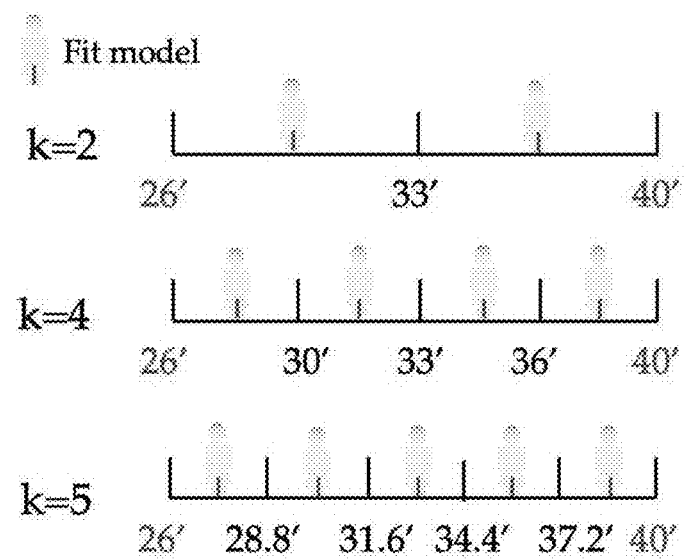
FIG. 12 is a diagram illustrating example grouping according to a traditional method.

FIG. 12 shows four examples when k=2, 4, 5 and 6, respectively, assuming the full range of underbust circumference is from 28 to 40 inches (assumed integer values rather than actual values were used for better legibility). In addition, the prototype shape of a group (of an interval) was set to be whosever the underbust circumference was closest to the mid interval value (as shown in FIG. 12). The same process was executed to the DeltaB parameter. This way of categorization is referred to herein as the traditional method.

A partial AFL method was tested where groups where created based on either the measure underbust circumference or DeltaB, but the prototypes were selected in accordance with aspects of the disclosure, e.g., member of the group associated with the lowest within-group aggregated fit-loss.

Figure 13:
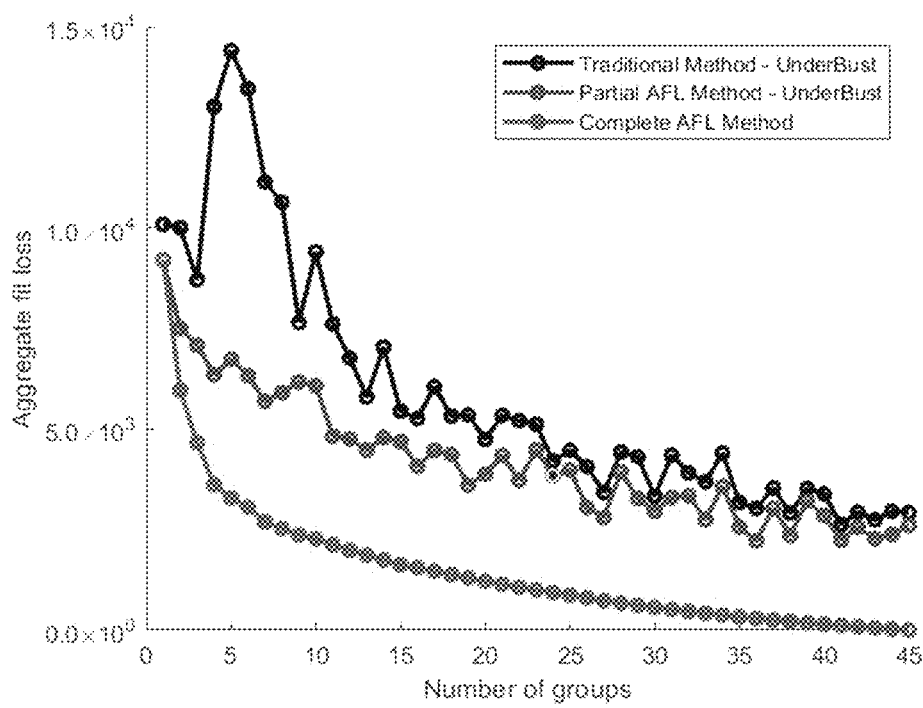
FIG. 13 illustrates comparison results of the methods and systems described in accordance with aspects of the disclosure with an AFL for the traditional method using underbust.
Figure 14:
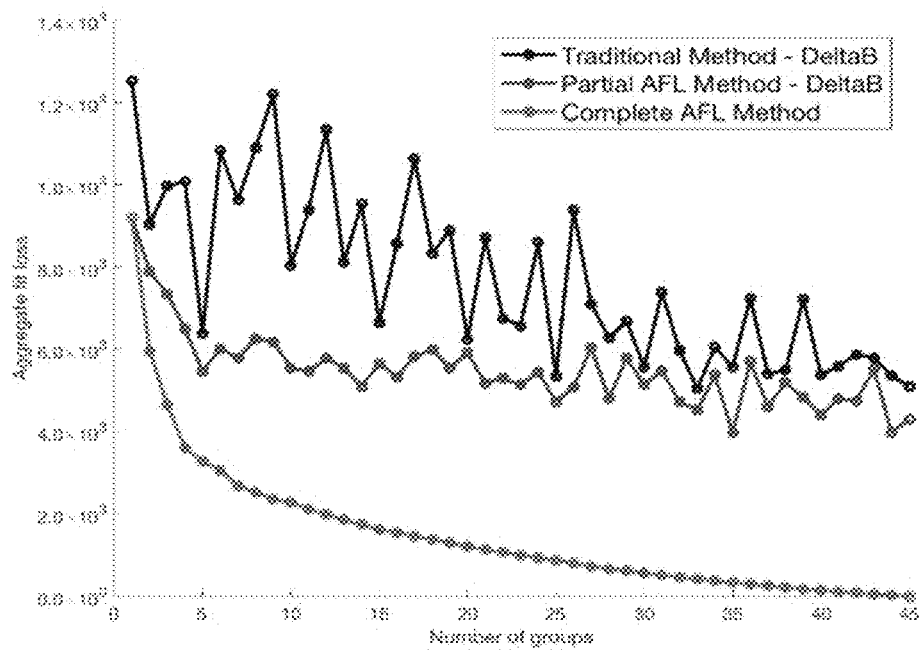
FIG. 14 illustrates comparison results of the methods and systems described in accordance with aspects of the disclosure with an AFL for the traditional method using DeltaB.

FIGS. 13-14 illustrate a comparison between the Traditional Method, the Partial AFL Method and the Complete AFL Method with respect to an aggregated fit-loss. FIG. 13 shows the categorization based on the underbust whereas FIG. 14 shows categorization based on DeltaB. The prototype of a group in the Traditional Method was set to be whoever the underbust circumference was closest to the mid-interval value (in FIG. 12) and the same with respect to the DeltaB (in FIG. 14). The fit-loss was calculated in the manner described above. Also for the partial AFL and complete AFL, the AFL for each k, where k varies from 1-45 was calculated in the manner described above. The Complete AFL method was clustered into groups using K-medoids clustering.

The Traditional Method, the Partial AFL Method and the Complete AFL Method using K-medoids clustering, represented by a black curve, a blue curve and a red curve, respectively.

In both cases (categorized by underbust circumference or by DeltaB), a significant reduction in the overall aggregate-fit-loss can be observed in the blue curve from the black curve. This demonstrates the improvement in optimizing the prototype in accordance with aspects of the disclosure. A much more significant reduction can be observed in the red curve. This demonstrates the improvement in both clustering and optimizing the prototype in accordance with aspects of the disclosure.

The methods and systems described herein may be applied to a population of images unconstrained by preconditions such as breast size and shape, and may also be applied to the population with constraints, such as band sizes. The introduction of band sizes as constraint into the categorization is referred to as a Hybrid AFL Method in this testing section. The 45 subjects are first sorted into band size groups based on their underbust measurements, then the optimization of AFL was done within each size group. A total of five band sizes were involved, namely Size 28, Size 30, Size 32, Size 34 and Size Over 34 (See table in FIG. 15A). Underbust measurement is more appropriate than bust measurement because the size of the ribcage is not impacted by factors like hormone level as much. For each band size, optimized categorizations (using k-medoid clustering and the algorithm that finds the optimal prototypes) were done j times, where j is the total number of subjects in that band-size group (e.g., j=12 for Size 32). The total number of sub-groups is represented by k and satisfies the following equation (Eq. 3):

$$k = j_1 + j_2 + j_3 + j_4 + j_5 \qquad \text{(Eq. 3)}$$

where $j_1$ to $j_5$ corresponds to the number of sub-groups for Size 28, 30, 32, 34 and Over 34, respectively. $j_i \geq 1$ (i=1 to 5) to maintain the structure of the band sizes (in other words, no band size is left out). In this example, k is at least 5, and at most 45 (when every subject forms a sub-group). Further calculations can be performed to distribute k into the five j's when k falls between 6 and 44.

To distribute k into the five j's, any of the j's by 1 can be increased by 1, which also means increasing k by 1. This will result in a reduction in the overall AFL. There is always one particular j which corresponds to the maximum reduction in the overall AFL among the five j's. Therefore, the methods and systems described herein can run a program or a set of instructions (e.g., instructions 113) to obtain the band-size group whose j corresponds to the maximum decrease in the overall AFL when j increases by 1 as described above. The process can be set to begin with k=5 (when all j's equal 1), add one sub-group each time while keeping track of the AFL value, and finally stop at k=45 (when all j's reach their maximum). A table in FIG. 15B shows part of the result. The table shows the increase from k=5 to k=6 and then increments of 5 for the increase up to 45.

Figure 16A:
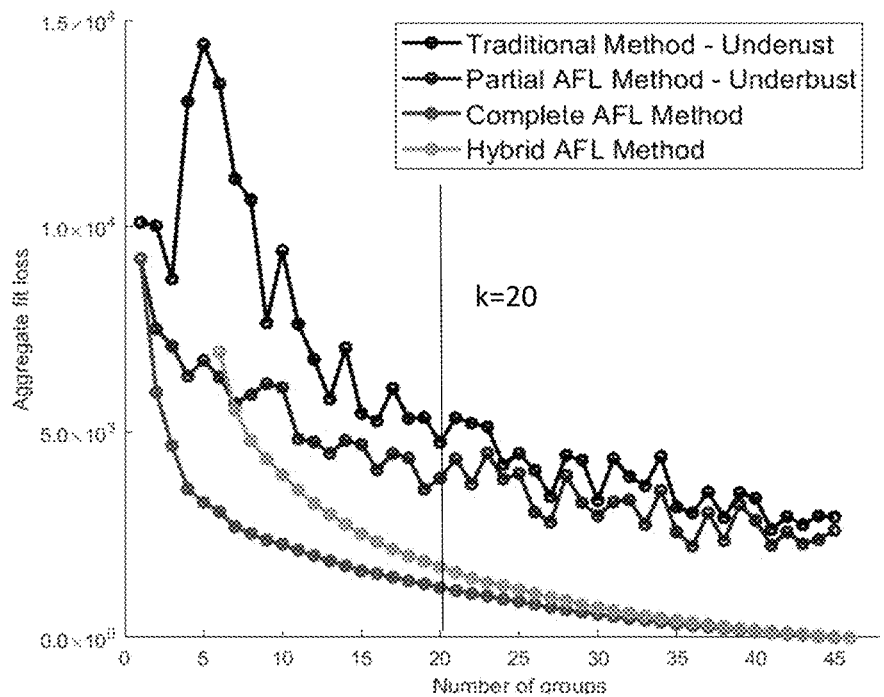
FIG. 16A is a comparison results of the methods and systems described in accordance with aspects of the disclosure with an AFL for the traditional method using underbust.
Figure 16B:
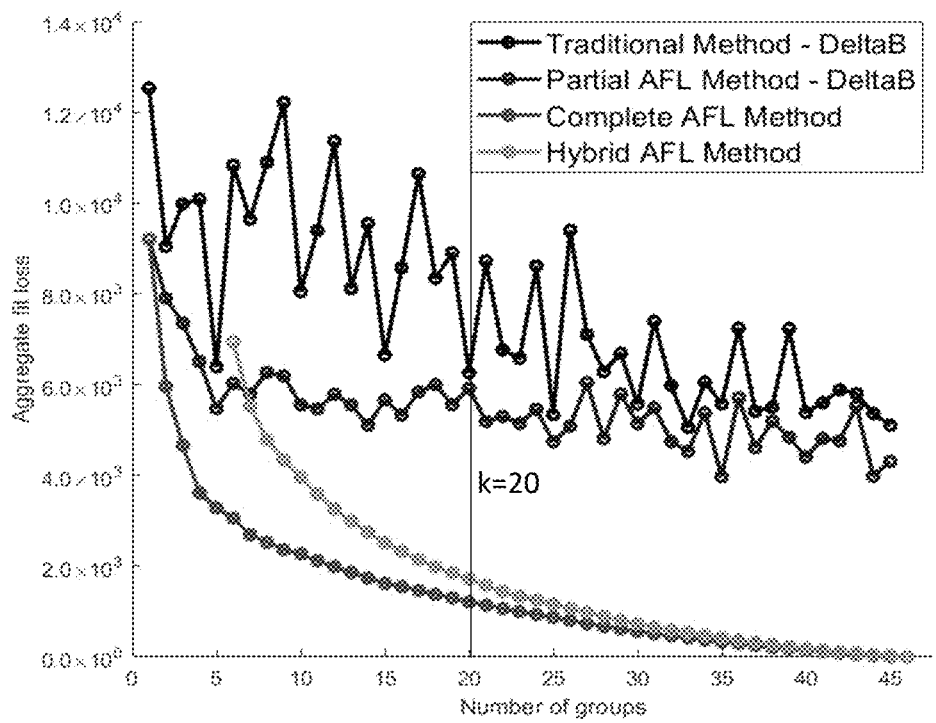
FIG. 16B is a comparison results of the methods and systems described in accordance with aspects of the disclosure with an AFL for the traditional method using DeltaB.

FIG. 16A shows an example comparison of the Hybrid AFL Method, the Complete AFL Method, the Partial AFL Method, and Traditional Method, when applied in traditional categorization based on Underbust circumference. FIG. 16B shows an example comparison of the Hybrid AFL Method, the Complete AFL Method, the Partial AFL Method, and the Traditional Method, when applied in traditional categorization based on DeltaB (e.g., difference between bust and underbust). The curve for the Hybrid AFL Method was generated in a manner described herein. In the example comparison results shown in FIGS. 16A and 16B, a green curve shows the results of the Hybrid AFL Method. The decrease in the AFL from the black and blue curves (the Traditional Method and the Partial AFL Method) are still relatively significant. The Hybrid AFL Method may provide a more realistic application for the sizing systems of bras because the hybrid method keeps the structure of band sizes, and can still achieve a significant improvement in sizing. The clustering results may be maintained, and new cases be added as described before. Furthermore, when k=20 (which means 86.8% of decrease in the overall AFL from k=1), it requires only four cup sizes per band size on average (4×5=20). Considering the wide variety of cup sizes in the market (from A Cup to G Cup or more), four is an acceptable number.

Building or improving a sizing system may require a relatively large dataset. In an example, the system 100 can collect data through online platforms, where consumers are offered the option of uploading their own body scans (there are already some inexpensive 3D scanner available for purchase and maybe in the short future it will be very common for each household to own a 3D scanner. Also it is possible that certain mobile apps will be developed and allow people to scan themselves using their phone). Another way is by setting up 3D body scanners at physical stores. Then not only can we use computer programs to recommend sizes to the consumers, we can also constantly update the database to ensure constantly offering good fit to the consumers. In some examples, software such as Matlab® can be used to process the 3D scans and generate the dissimilarity matrix, and used R to do the statistical analysis (cluster analysis, etc.). However, any software or programming languages that can achieve the functions may be used. The use of the term "Traditional" in the "Traditional Method" is not an admission that the method is known, rather coined to refer to how a prototype for each group is selected.

Assign Weights to the Fit-Loss Function

The methods and systems described herein may not take the perception of fit into consideration, and the objectivity of subjective fit evaluation can vary greatly by individuals. However, it cannot be ignored that a wearer might feel quite differently for a garment being too large, in contrast for a garment being too small (she may have more tolerance for a garment being large than being small). Hence, in accordance with aspect of the disclosure, the processor 112 may set different penalties for a shape being larger than the prototype shape, in contrast for a shape being smaller. This can be done by assigning different weights to the fit-loss function for positive and negative shape differences. In addition, certain areas on the body can be more sensitive than the other areas. This can also be taken into consideration by assigning weights to the fit-loss function based on areas located on the body (because the 9000 points on scan surface are all sorted in the same way, it is not difficult to locate areas).

Other Clustering Method

Although K-medoid clustering, and Hierarchical clustering based on Ward's method, Complete-linkage and Centroid-linkage are compared in the tests described herein, other clustering methods may be used as long as they use a dissimilarity matrix to do categorization.

Include the Shoulders in Quantifying the Shape Discrepancies

Figure 17:
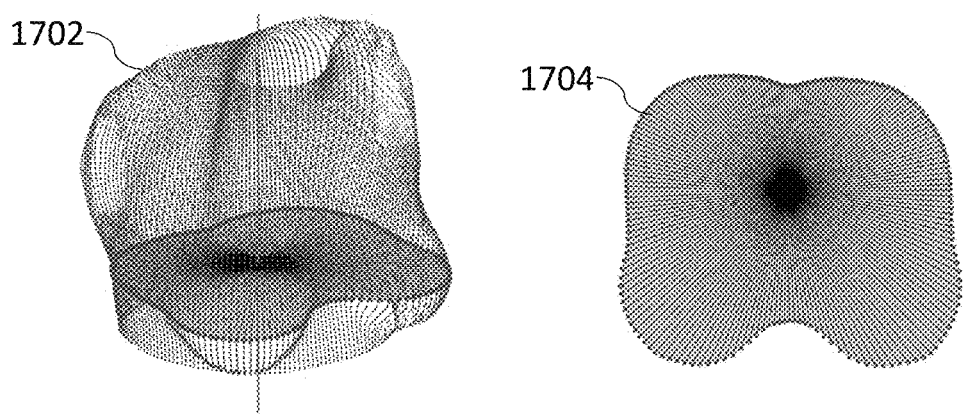
FIG. 17 is a diagram illustrating body parts that may be used to develop a sizing scheme accordance with aspects of the disclosure.

While the disclosure focuses on the breast shape and may be more informative for bra cup design, as noted above, other body parts and/or additional body parts may be sized. For example, aspects of the disclosure, may be used to improve the design and sizing for pullover bras. For example, the second region of interest may include the shoulders and the posterior body (See 3D image 1702 in FIG. 17). Additionally, the number of data points may be increased to account for the additional area. For example, the number of data point may be 18,000 points, with 100 horizontal slices and on each slice one point at every other degree from −180° to 180° (−n to n). (See slice 1704 in FIG. 17). The processor 112 may determine the dissimilarity matrix based on the 18,000 points.

Figure 18:
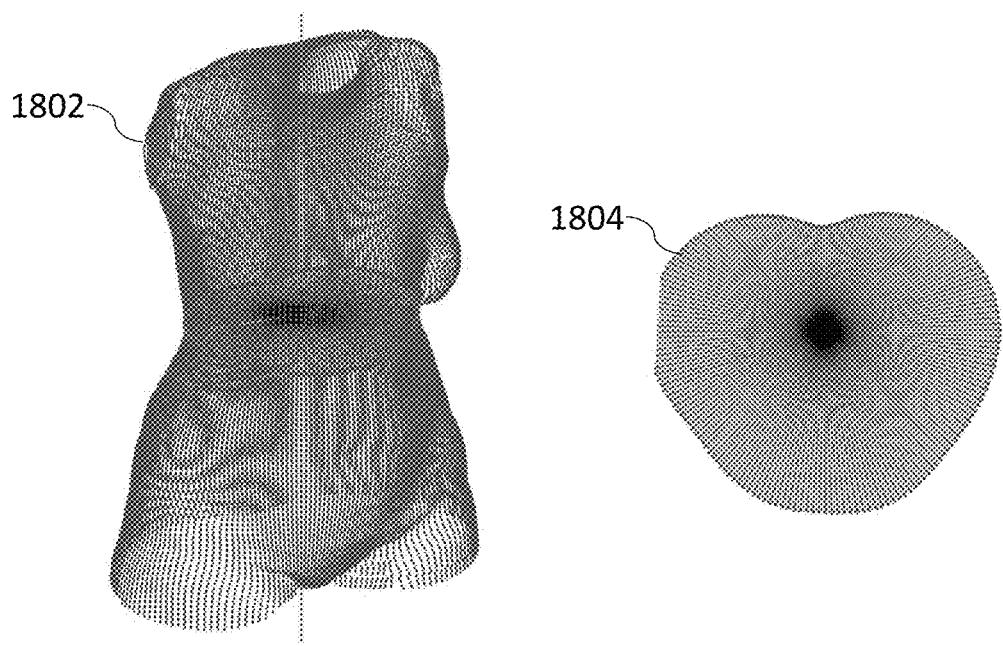
FIG. 18 is a diagram illustrating body parts that may be used to develop a sizing scheme in accordance with aspects of the disclosure.

The methods and systems described here can also be applied to other types of apparel products, such as blouses, t-shirts, dresses, swim gear, etc. 3D images showing areas above the hips can include 36,000 points, with 200 horizontal slices and on each slice one point at every other degree from −180° to 180° (−n to n). (See 3D image 1802 and slice 1804 in FIG. 18). The processor 112 may determine the dissimilarity matrix based on the 36,000 points. In this aspect, the scans may be shifted vertically to align at the waist level (i.e. waist plane locates at Plane z=0) in a similar manner as described above.

In summary, the methods and systems described herein can recommend sizes for an existing sizing framework to consumers. Fit models or prototypes can be selected in accordance with aspects of the disclosure for the size recommendation approach to work. The apparel products are still designed to fit perfectly for the fit models, so it is still meaningful to calculate the fit-loss between a consumer and the fit models to determine the most appropriate size for the consumer. Further, without modifying the sizing system, human fit models or build dress forms of the prototype shapes m be selected.

Typically, the apparel companies only do fit-testing on the fit models of one or very few sizes, then use proportional grading to obtain pattern pieces for the other sizes. This practice creates lots of fit issues for consumers of the "other" sizes. Further, fit models can be selected from the consumers, which may require a platform of uploading and collecting body scans to be built, to be able to identify the most representative shapes. After identifying a consumer who has a very representative breast shape (or general body shape for other apparel applications) and receiving consent from her, the apparel company can build dress form for her, or send sample garments to her and ask for try-ons and fit tests. Even if she is not an expert in fit evaluation, she can simply take pictures of herself and provide feedbacks on comfort, etc. This can be a back-and-forth process as there might be several versions of the sample garments (having several iterations is very common for garment development nowadays and it is a very time-consuming step because usually apparel companies need to receive sample garments from their factories), but the methods and systems described herein can provide a practical application that saves time and cost. Also, the apparel companies do not need to hire and keep fit models themselves. (On the other hand the consumer who is invited in this process will be very motivated to participate because she would be receiving a custom fit garment with no cost).

Also, the methods and systems described herein can be performed with or without the traditional measurements extracted from 3D scans (measured along the surface of the scan). Our method measures each point's distance from the origin point and not in a traditional way to extract measurements. Some of the measurements performed in traditional ways are along the curvature of the surface, others are linear measures based on landmarks: for example, calculate the distance between two body landmarks, or calculate the area or angles of a triangle constructed by three body landmarks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. Aspects were chosen and described in order to best explain the principles and the practical application, and to enable others of ordinary skill in the art to understand the invention for various embodiments with various modifications as are suited to the particular use contemplated.

What is claimed is:

1. A method for developing a sizing scheme for a body part, the method comprising:
   receiving, by a processor, a plurality of three-dimensional (3D) images, wherein the plurality of 3D images includes a body part of a body of different individuals;
   for each 3D image among the plurality of 3D images:
   identifying a first region of interest in the 3D image;
   shifting, by the processor, the first region of interest to align a central axis of the first region of interest with a 3D reference point, the central axis being parallel to a longitudinal axis of a body of an individual;
      shifting, by the processor, the first region of interest in a vertical direction, the vertical direction being parallel to a longitudinal axis of the body to align a landmark feature in the first region of interest with the 3D reference point;
      identifying a second region of interest in the first region of interest;
      identifying, by the processor, a number of data points on a surface of the second region of interest;
      determining, by the processor, a plurality of distances between the number of data points and the 3D reference point;
      comparing, by the processor, the plurality of distances with distances determined for the same data points in each one of the other 3D images at the same data points, such that the 3D image is compared with every other 3D image among the plurality of 3D images in pairs;
      determining, by the processor, a fit-loss value for every possible combination of pairs of 3D images with respect to the second region of interest among the plurality of 3D images, wherein each fit-loss value indicates a discrepancy between the corresponding pair of 3D images with respect to the second region of interest, and the determination of the fit-loss value of each pair of 3D images is based on a result of the comparison of distances between the pair of 3D images with respect to the second region of interest;
   generating, by the processor, a dissimilarity matrix using the fit-loss values determined for each pair of 3D images; and
   clustering, by the processor, the plurality of 3D images into a number of groups based on the dissimilarity matrix, wherein each group corresponds to a size for the body part.

2. A method for assigning a body part to a size in a sizing scheme for the body part, the method comprising:
   receiving, by a processor, a three-dimensional (3D) image that includes the body part of a body of an individual;
   identifying a 3D reference point;
   identifying a region of interest;
   identifying, by the processor, a number of data points on a surface of the region of interest;
   determining, by the processor, a plurality of distances between the number of data points and the 3D reference point;
   extracting, by the processor, a plurality of prototype images from a memory, wherein the plurality of prototype images represents a plurality of size groups, respectively;
   comparing, by the processor, the plurality of distances determined for the received 3D image with distances determined for the same data points in each one of the prototype images with respect to the region of interest, such that the received 3D image is compared with every prototype image among the plurality of prototype images in pairs with respect to the region of interest;
   determining, by the processor, a fit-loss value between the received 3D image and each one of the extracted prototype images with respect to the region of interest based on the comparing;
   identifying, by the processor, a lowest fit-loss value among the determined fit-loss values; and
   assigning the received 3D image to the size group represented by the prototype image corresponding to the lowest fit-loss value,
   wherein the plurality of size groups are based on a dissimilarity matrix generated using a plurality of fit-loss values corresponding to every possible combination of pairs of 3D images among a plurality of 3D images, wherein the plurality of 3D images include the body part of different individuals.

3. The method of claim 2, wherein the body part is a pair of breasts.

4. The method of claim 2, further comprising:
   identifying another region, the another region including the region of interest, the another region being an entire torso;
   determining a first average value of image points among the another region in a first direction, the first direction being to orthogonal a longitudinal axis of the body;
   determining a second average value of image points among the another region in a second direction orthogonal to the first direction and orthogonal to a longitudinal axis of the body; and
   defining a central axis of the another region as intersecting by the first average value and the second average value, wherein the central axis is orthogonal to the first and second directions.

5. The method of claim 4, further comprising:
   shifting, by the processor, the another region to align the central axis of the another region with the 3D reference point, the central axis being parallel to the longitudinal axis of the body of the individual.

6. The method of claim 4, further comprising shifting, by the processor, the another region in a vertical direction, the vertical direction being parallel to a longitudinal axis of the body to align a landmark feature in the another region with the 3D reference point by shifting the another region until a plane orthogonal to the central axis intersects with the 3D reference point, wherein the plane intersects the landmark feature.

7. The method of claim 6, wherein the landmark feature is determined by defining a midpoint between a pair of nipples in the vertical direction and wherein the plane intersects the midpoint.

8. The method of claim 2, wherein identifying the region of interest comprises removing image points located on a first side of a plane parallel to a coronal plane of the body and intersects the 3D reference point, and the body part is located on a second side of the plane parallel to the coronal plane opposite from the first side.

9. The method of claim 2, identifying another region, the another region including the region of interest, the another region being an entire torso, wherein identifying the region of interest comprises:
   rotating the 3D image to an angle where Moiré patterns are formed;
   identifying an upper bound of the region of interest based on the formed Moiré patterns; and
   identifying an immediate crease of a protruded region in the another region to identify a lower bound of the region of interest.

10. The method of claim 2, wherein the plurality of fit-loss values are determined based on a dissimilarity function that quantifies a shape difference between a pair of 3D images with respect to the region of interest.

11. The method of claim 2, wherein the 3D image is received from one or more 3D scanners.

12. The method of claim 11, wherein the one or more 3D scanners is one or more of a mobile phone, a point of sale terminal, a 3D body scanner, a handheld 3D scanner, or a stationary 3D scanner.

13. The method of claim 2, further comprising:
   designating the received 3D image as a candidate prototype image of the assigned size group;
   determining an aggregated fit-loss value for the assigned size group based on the received 3D image being designated as the candidate prototype image;
   comparing the determined aggregated fit-loss value with an original aggregated fit-loss value of the assigned size group plus the fit-loss value between the received 3D image and the prototype image;
   in response to the determined aggregated fit-loss value being less than the original aggregated fit-loss value plus the fit-loss value between the received 3D image and the prototype image, assigning the received 3D image as a new prototype image in the assigned size group; and
   in response to the determined aggregated fit-loss value being greater than or equal to the original aggregated fit-loss value plus the fit-loss value between the received 3D image and the prototype image, keeping the prototype image as the prototype image of the assigned size group.

14. A method for assigning a body part to a size in a sizing scheme for the body part, the method comprising:
   receiving, by a processor, a three-dimensional (3D) image that includes a body part of a body of an individual;
   identifying a 3D reference point;
   identifying a first region of interest in the 3D image;
   determining, by the processor, a band size based on a size parameter of a circumference of a lower bound of the body part in the first region of interest, wherein the band size is among a plurality of band sizes;
   extracting, by the processor, a plurality of prototype images from a memory, wherein the plurality of prototype images represents a plurality of shape groups corresponding to the determined band size;
   identifying a second region of interest in the first region of interest;
   identifying, by the processor, a number of data points on a surface of the second region of interest;
   determining, by the processor, a plurality of distances between the number of data points and the 3D reference point;
   comparing, by the processor, the plurality of distances determined for the received 3D image with distances determined for the same data points in each one of the extracted prototype images representing the plurality of shape groups corresponding to the determined band size with respect to the second region of interest, such that the received 3D image is compared with every extracted prototype image among the plurality of prototype images in pairs with respect to the second region of interest;
   determining, by the processor, a fit-loss value between the received 3D image and each one of the extracted prototype images with respect to the second region of interest based on the comparing;
   identifying, by the processor, a lowest fit-loss value among the determined fit-loss values; and
   assigning the received 3D image to the shape group represented by the prototype image corresponding to the lowest fit-loss value, wherein a recommend size group includes the determined band size and the shape group,
   wherein the plurality of shape groups in each of the plurality of band sizes are based on a dissimilarity matrix generated using a plurality of fit-loss values corresponding to every possible combination of pairs of 3D images among a plurality of 3D images assigned to a respective band size with respect to the second regions of interest, wherein the plurality of 3D images include the body part of different individuals.

15. The method of claim 14, wherein the body part is a pair of breasts.

16. The method of claim 14, further comprising, in response to identifying the first region of interest, the first region of interest including an entire torso:
   determining a first average value of image points among the first region of interest in a first direction, the first direction being to orthogonal a longitudinal axis of the body;
   determining a second average value of image points among the first region of interest in a second direction orthogonal to the first direction and orthogonal to a longitudinal axis of the body; and
   defining a central axis of the first region of interest as intersecting by the first average value and the second average value, wherein the central axis is orthogonal to the first and second directions.

17. The method of claim 16, further comprising:
   shifting, by the processor, the first region of interest to align the central axis of the first region of interest with the 3D reference point, the central axis being parallel to the longitudinal axis of the body of the individual.

18. The method of claim 16, further comprising shifting, by the processor, the first region of interest in a vertical direction, the vertical direction being parallel to the longitudinal axis of the body to align a landmark feature in the first region of interest with the 3D reference point, by shifting the first region of interest until a plane orthogonal to the central axis intersects with the 3D reference point, wherein the plane intersects the landmark feature.

19. The method of claim 18, wherein the landmark feature is determined by defining a midpoint between a pair of nipples in the vertical direction and wherein the plane intersects the midpoint.

20. The method of claim 14, wherein identifying the second region of interest comprises removing image points located on a first side of a plane parallel to a coronal plane of the body and intersects the 3D reference point, and the body part is located on a second side of the plane parallel to the coronal plane opposite from the first side.

21. The method of claim 14, wherein identifying the second region of interest comprises:
rotating the first region of interest to an angle where Moiré patterns are formed;
identifying an upper bound of the second region of interest based on the formed Moiré patterns; and
identifying an immediate crease of a protruded region in the first region of interest to identify a lower bound of the second region of interest.

22. The method of claim 14, wherein the size parameter is received from another device.

23. The method of claim 14, wherein determining the band size comprises:
determining the circumference of the lower bound of the body part in the first region of interest; and
identifying a size parameter range that includes the determined circumference; and
assigning the band size representing the size parameter range as the band size of the body part in the 3D image.

24. The method of claim 14, wherein the plurality of fit-loss values are determined based on a dissimilarity function that quantifies a shape difference between a pair of 3D images with respect to the second region of interest.

25. The method of claim 14, wherein the 3D image is received from one or more 3D scanners.

26. The method of claim 25, wherein the one or more 3D scanners is one or more of a mobile phone, a point of sale terminal, a 3D body scanner, a handheld 3D scanner, or a stationary 3D scanner.

27. The method of claim 14, further comprising:
designating the received 3D image as a candidate prototype image of the assigned shape group within the determined band size;
determining an aggregated fit-loss value for the assigned shape group based on the received 3D image being designated as the candidate prototype image;
comparing the determined aggregated fit-loss value with an original aggregated fit-loss value of the assigned shape group plus the fit-loss value between the received 3D image and the prototype image;
in response to the determined aggregated fit-loss value being less than the original aggregated fit-loss value plus the fit-loss value between the received 3D image and the prototype image, assigning the received 3D image as a new prototype image in the assigned shape group; and
in response to the determined aggregated fit-loss value being greater than or equal to the original aggregated fit-loss value plus the fit-loss value between the received 3D image and the prototype image, keeping the prototype image as the prototype image of the assigned shape group.

28. A method for developing a sizing scheme for a body part, the method comprising:
receiving, by a processor, a plurality of three-dimensional (3D) images, wherein the plurality of 3D images includes a body part of a body of different individuals;
for each 3D image among the plurality of 3D images:
identifying a first region of interest in the 3D image;
determining a size parameter corresponding to a circumference of a lower bound of the body part in the first region of interest;
assigning the 3D image to a band size based on the size parameter;
shifting, by the processor, the first region of interest to align a central axis of the first region of interest with a 3D reference point, the central axis being parallel to a longitudinal axis of a body of an individual;
shifting, by the processor, the first region of interest in a vertical direction, the vertical direction being parallel to a longitudinal axis of the body to align a landmark feature in the first region of interest with the 3D reference point;
identifying a second region of interest in the first region of interest;
identifying, by the processor, a number of data points on a surface of the second region of interest;
determining, by the processor, a plurality of distances between the number of data points and the 3D reference point; and
comparing, by the processor, the plurality of distances with distances determined for the same data points in each one of the other 3D images assigned to the same band size, such that the 3D image is compared with every other 3D image among the 3D images assigned to the same band size in pairs;
for each band size:
determining, by the processor, a fit-loss value for every possible combination of pairs of 3D images with respect to the second region of interest among the 3D images assigned to the same band size, wherein each fit-loss value indicates a discrepancy between the corresponding pair of 3D images with respect to the second region of interest, and the determination of the fit-loss value of each pair of 3D images is based on a result of the comparison of distances between the pair of 3D images with respect to the second region of interest;
generating, by the processor, a dissimilarity matrix using the fit-loss values determined for each pair of 3D images assigned to the same band size; and
clustering, by the processor, the 3D images assigned to the band size into a number of shape groups based on the dissimilarity matrix, wherein each shape group corresponds to a shape for the body part.

* * * * *